US012595139B1

(12) United States Patent
Mowery et al.

(10) Patent No.: US 12,595,139 B1
(45) Date of Patent: Apr. 7, 2026

(54) HIGH-SPEED ARRAY FORMER AND METHODS THEREOF

(71) Applicant: DYCO, INC., Bloomsburg, PA (US)

(72) Inventors: Justin Lee Mowery, Nescopeck, PA (US); Benjamin M. Kuznicki, Bloomsburg, PA (US); Peter D. Yohe, Bloomsburg, PA (US); John Thomas Wilson, Elysburg, PA (US)

(73) Assignee: DYCO, Inc., Bloomsburg, PA (US)

( * ) Notice: Subject to any disclaimer, the term of this patent is extended or adjusted under 35 U.S.C. 154(b) by 0 days.

(21) Appl. No.: 18/906,560

(22) Filed: Oct. 4, 2024

(51) Int. Cl.
*B65G 47/71* (2006.01)
*B65G 47/32* (2006.01)

(52) U.S. Cl.
CPC ........... *B65G 47/715* (2013.01); *B65G 47/32* (2013.01)

(58) Field of Classification Search
CPC .... B65G 47/082; B65G 47/52; B65G 47/681; B65G 57/22; B65G 2201/0244; B65G 57/24; B65G 47/715; B65G 47/32; B65B 35/40; B65B 21/06; B65B 35/20; B65B 35/30
USPC .... 198/429, 431, 433, 432, 736, 747, 419.1, 198/426; 414/792.6, 791.6
See application file for complete search history.

(56) References Cited

U.S. PATENT DOCUMENTS

| | | | | | |
|---|---|---|---|---|---|
| 2,687,797 | A | * | 8/1954 | Hirsch | B65G 47/82 |
| | | | | | 198/433 |
| 3,776,342 | A | * | 12/1973 | Kulig | C03B 35/12 |
| | | | | | 198/430 |
| 4,724,946 | A | * | 2/1988 | Cinotti | B65G 47/31 |
| | | | | | 198/460.1 |
| 5,097,939 | A | * | 3/1992 | Shanklin | B65G 47/31 |
| | | | | | 198/460.1 |
| 5,105,606 | A | * | 4/1992 | Creed | B65B 35/38 |
| | | | | | 53/499 |
| 5,799,770 | A | * | 9/1998 | Radewagen | B65G 47/914 |
| | | | | | 198/432 |
| 5,893,449 | A | * | 4/1999 | Leidy | C03B 35/06 |
| | | | | | 198/740 |
| 5,950,799 | A | * | 9/1999 | Peltier | C03B 9/41 |
| | | | | | 198/430 |
| 7,874,417 | B2 | * | 1/2011 | Oppici | B65G 47/084 |
| | | | | | 198/419.3 |

(Continued)

FOREIGN PATENT DOCUMENTS

WO     WO-2023119154 A1 *  6/2023  ........... B65B 35/243

*Primary Examiner* — Gregory W Adams
(74) *Attorney, Agent, or Firm* — McNees Wallace & Nurick

(57)     ABSTRACT

A system for forming an array of articles is provided. The system includes at least an infeed single lane conveyor moving a plurality of articles, an array forming conveyor for receiving the articles, a programmable robot for transferring the articles to the array forming conveyor, the programmable robot includes a pusher mounted at an end of the programmable robot that is configured to form and push a row of articles to the array forming conveyor, forming an array of articles, and an article metering device including a speed controller to control the flow of articles into a sweeping area of the infeed single lane conveyor. The programmable robot may include a conveyor tracking element to match a speed of the infeed conveyor to provide a continuous flow of articles.

20 Claims, 28 Drawing Sheets

(56) References Cited

U.S. PATENT DOCUMENTS

| | | | | |
|---|---|---|---|---|
| 8,746,436 B2 * | 6/2014 | Yohe | ...................... | B65G 47/53 |
| | | | | 198/460.1 |
| 8,783,447 B1 * | 7/2014 | Yohe | ...................... | B65G 15/14 |
| | | | | 198/814 |
| 9,580,254 B2 * | 2/2017 | Papsdorf | .............. | B65G 47/841 |
| 9,586,769 B2 * | 3/2017 | Yohe | ...................... | B65B 5/061 |
| 10,144,596 B2 * | 12/2018 | Yohe | ...................... | B65G 47/74 |
| 10,850,931 B2 * | 12/2020 | Gehin | ................... | B65G 47/82 |
| 10,899,557 B2 * | 1/2021 | Cirette | ................ | B65G 47/715 |
| 11,027,928 B2 * | 6/2021 | Ericson | .............. | B65G 47/715 |
| 11,155,422 B2 * | 10/2021 | Berger | .............. | B65G 47/5109 |
| 11,377,306 B2 * | 7/2022 | Senn | ................... | B65G 47/715 |
| 11,787,641 B2 * | 10/2023 | Elsperger | ............ | B65G 47/715 |
| | | | | 198/419.3 |
| 2015/0291367 A1 * | 10/2015 | Petrovic | ................ | B65G 37/00 |
| | | | | 198/347.1 |
| 2021/0237983 A1 * | 8/2021 | Alig | ...................... | B65G 47/32 |
| 2023/0211959 A1 * | 7/2023 | Helfrich | .............. | B65G 47/715 |
| | | | | 198/418.7 |

* cited by examiner

HIGH-SPEED ARRAY FORMER AND METHODS THEREOF

TECHNICAL FIELD

The present disclosure relates to apparatuses, systems, and methods for forming an array of articles. More specifically, the present disclosure relates to apparatuses, systems, and methods for automatically forming an array of articles at high speed in a continuous flow.

BACKGROUND

In many manufacturing and packaging processes, it is desirable to form large quantities of articles, such as empty bottles, into article arrays so they can be automatically bulk palletized, bagged or loaded into a box or pallet. Depending on the design and shape of the articles, there are various speeds in forming the arrays. For example, in industry standards, a formation of article arrays of 1 to 100 bottles per minute (bpm) is considered a slow speed range, a formation of article arrays of 100 to 300 bpm is considered a medium speed range, and a formation of article arrays of 300 to 1200 bpm is considered a high-speed range.

In one approach, a slow speed array formation can employ a single row infeed pusher that isolates a single row of bottles using a slice-off brake. After the row is positioned by a stop, the stationary articles (e.g., bottles) are transferred onto a conveyor table with a pneumatic pusher. When the pusher has returned to its home position, the next row of articles will be fed into the pusher. However, the row of articles always stops prior to being pushed, producing longer processing time.

In another approach, a medium speed array formation can use a dual row servo pick-and-place with a divider. In this system, a single lane of articles is separated into two lanes using a pneumatic or servo bottle divider. The articles are then isolated into two rows using slice-off brakes. Once the rows have settled into position at a stop, a dual row pick and place assembly grips the stationary articles and transfers them to an array forming conveyor table. Similarly, the rows are continually stopped prior to being picked and placed, producing also longer processing times. In another medium speed formation, a single row of articles using a slice-off brake is used. Specifically, after the row is positioned by a stop, a programmable robot, with a mounted gripper, picks the stationary row of articles off of the conveyor and places the row of articles onto a mattop conveyor table. Again, this yields the row of articles to be paused prior to being picked.

In yet another approach, a medium to high-speed array formation can employ a servo sweeping device to form the article arrays. The articles are first separated into multiple lanes (e.g., 4 infeed rows, but is typically 4 to 8 rows wide infeeding simultaneously). The rows of articles are then isolated using conveyor brakes and transported to an end stop. Once the rows are positioned, a servo driven lane sweeps the stationary articles onto the array build table. As with most current systems, the rows are paused or stopped prior to being pushed.

Other medium to high-speed approach employs a robotic sweeping device to form arrays. The bottles are first separated into multiple lanes (typically 4 to 8 lanes), and the rows of bottles are then isolated using conveyor brakes and flow to an end stop. Once the rows are positioned, a robot arm grips the stationary bottles and sweeps them onto the mattop table. Similarly, the rows are always stopped prior to being pushed.

As discussed above, each approach has the rows being isolated with infeed brakes and paused when the bottles settle against an end stop, producing longer processing time. Moreover, stoppage of the articles can cause a shock wave and can cause tipping of unstable bottles, both in the row and on bottles that are upstream of the row being transferred.

Accordingly, there is a need for improved systems and methods for forming article arrays that do not suffer from these shortcomings.

SUMMARY

In an exemplary embodiment, a system includes at least an infeed single lane conveyor moving a plurality of articles, an array forming conveyor for receiving the articles, a programmable robot for transferring the articles to the array forming conveyor, the programmable robot includes a pusher mounted at an end of the programmable robot that is configured to form and push a row of articles to the array forming conveyor, forming an array of articles, and an article metering device including a speed controller to control the flow of articles into a sweeping area of the infeed single lane conveyor. The programmable robot may include a conveyor tracking element to match a speed of the infeed conveyor to provide a continuous flow of articles.

In another example embodiment, a system for forming an array of articles includes an infeed single lane conveyor moving a plurality of articles and configured to move in a first direction, an array forming conveyor configured to move in a second direction orthogonal to the first direction, a programmable robot for transferring the articles to the array forming conveyor, the programmable robot includes a pusher mounted at an end of the programmable robot that is configured to engage and form a row of articles in a sweeping area and releases the formed row of articles by pushing the formed row of articles onto the array forming conveyor, forming an array of articles arrangement, and an article metering device including a speed controller to control the flow of articles from the infeed single lane conveyor to the sweeping area, wherein at time of engagement of the row of articles in the sweeping area, the article metering device matches a speed of the infeed single lane conveyor in the first direction, and wherein at time of release of the formed row of articles from the sweeping area, the pusher mounted at an end of the programmable robot matches a speed of the array forming conveyor in the second direction.

In yet another example embodiment, a method of forming an array of articles includes transporting, on an infeed single lane conveyor, a plurality of articles, receiving and forming a row of articles by a programmable robot including a pusher, pushing, via the pusher of the programmable robot, the formed row of articles to an array forming conveyor to form an array of articles arrangement, controlling, via an article metering device including a speed controller, a flow of articles arriving from the infeed single lane conveyor, and based on the speed of the infeed conveyor, matching a motion of the programmable robot to provide a continuous flow of articles.

Other features and advantages of the present invention will be apparent from the following more detailed description of the preferred embodiment, taken in conjunction with the accompanying drawings which illustrate, by way of example, the principles of the invention.

Figure 1A:
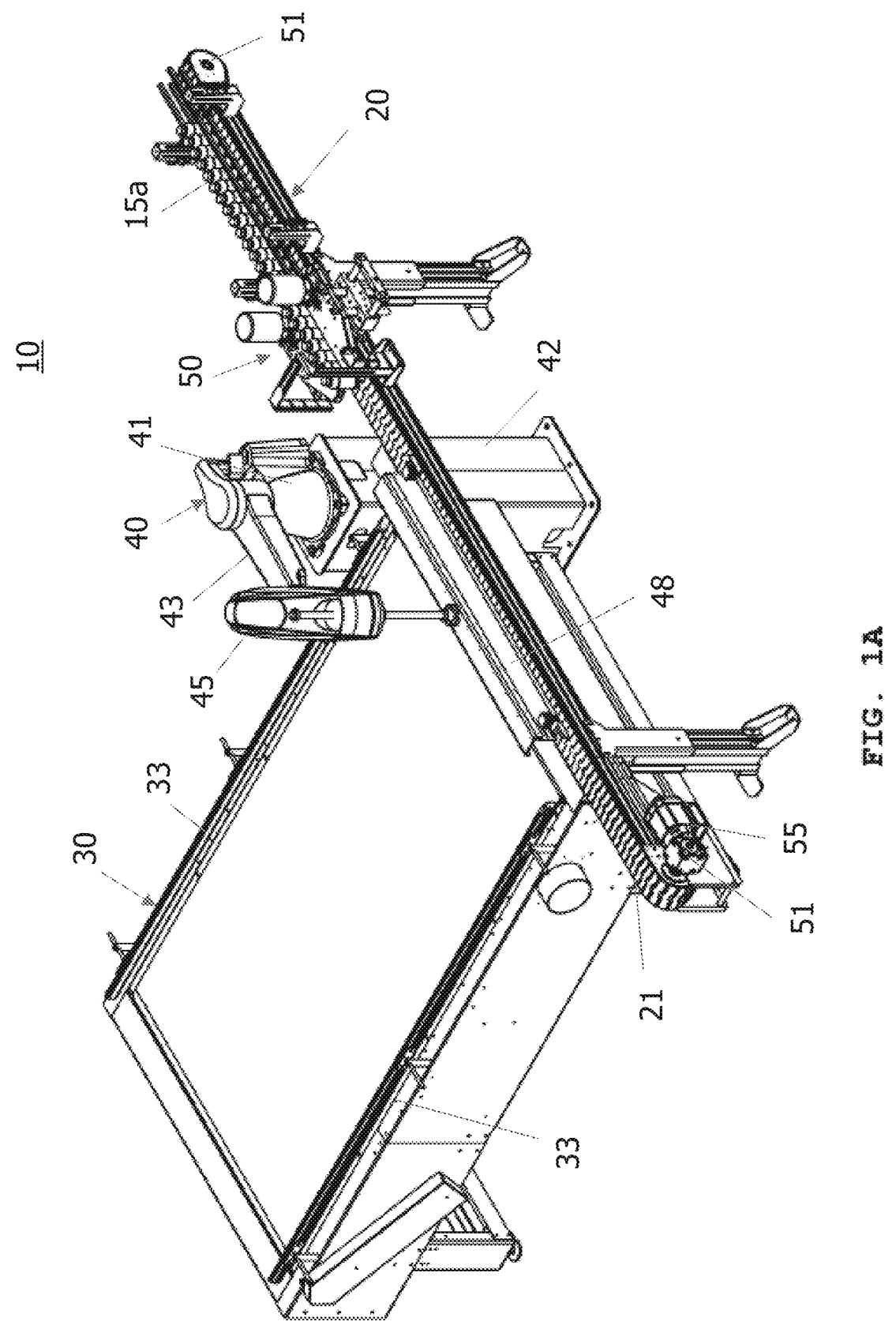
FIG. 1A is a perspective view of an exemplary array former, according to an example embodiment of the present disclosure.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of regions and/or structural elements may be reduced or exaggerated for clarity. The use of similar or identical reference numbers in the various drawings is intended to indicate the presence of a similar or identical element or feature.

DETAILED DESCRIPTION OF EXAMPLE EMBODIMENTS

Various non-limiting exemplary configurations of the present disclosure will now be described to provide an overall understanding of the principles of the structure, function, manufacture, and use of the system and method of forming article arrays disclosed herein. One or more examples of these non-limiting exemplary configurations are illustrated in the accompanying drawings. Those of ordinary skill in the art will understand that the article array formation system described herein and illustrated in the accompanying drawings are non-limiting example configurations and that the scope of the various non-limiting configurations of the present disclosure are defined solely by the claims. The features illustrated or described in connection with one non-limiting exemplary configuration may be combined with the features of other non-limiting exemplary configurations. Such modifications and variations are intended to be included within the scope of the present disclosure.

The present disclosure describes systems and methods for automatically forming (i.e., arranging, grouping, organizing) an array of articles (e.g., bottles, containers, etc.) at high speed in a smooth, continuous flow. Unlike conventional systems and methods, there is no need for stopping a row of articles prior to being pushed to an array forming conveyor that forms the article arrays. This creates an efficient and time-saving process in formation of the article arrays arrangement.

It is, accordingly, an object of the present disclosure to provide systems and methods for precisely operating and controlling the flow of articles at a substantially increased speed.

Another object of the present disclosure is to provide systems and methods of performing speed control of the conveyors and/or robot so that article arrays can be formed at optimal speeds and the articles can be conveyed to each conveyor without any stoppage.

Still another object of the present disclosure is to provide systems and methods of an intelligent type that properly matches the speed of an infeed conveyor with respect to the speed of an array receiving conveyor table or the robot, creating a smooth, continuous flow of formation of article arrays.

A related object to the previously mentioned object above of the present disclosure is to provide systems and methods of an additional robot system in tandem to the above conveyors to transport the articles and increase efficiency and reliability.

An additional related object is to provide a system utilizing positioning and transferring articles at precise intervals for matching the speeds of the conveyors and to ensure a constant, closely spaced flow of articles for article array formation at a high-speed.

In accordance with a feature of the present disclosure, the present system provides a transfer conveyor means operating at a high-speed, and at substantially constant speed to enable a proper gap (or spacing) between each interval of forming a row of articles. At the same time, the present system is operative to match the speed of the infeed conveyor to the robot for further assuring proper positioning while operating at optimal high speed. As such, the articles along the flow path of the system of the present invention are properly phased, gapped and speed controlled so as to assure maximum high speed and efficiency of the system.

With the systems of the present invention, previously stopping after the formation of a row of articles to be pushed is avoided and, instead handled in a continuous flow without any significant stoppage or slow-down. In some implementations, the infeed conveyor remains at a constant speed and is independent of the speed of the array forming conveyor. An encoder, a controller and conveyor drive motors are utilized to assure proper positioning and speed matching under all circumstances. It is particularly important that the system can operate efficiently at high production speeds, or cycle times as low as 1 second, without an article being missed or a jam occurring.

Further, as an important adjunct to matching speeds, an article metering device (i.e., throttle) is positioned in a path of the infeed conveyor. The purpose of this article metering device is to meter (control) the flow of articles into a sweeping area of the infeed conveyor. In addition, the operation of the article metering device can provide the gaps between each adjacent rows of articles formed via the robot. This is done by slightly accelerating, decelerating or temporarily stopping the operation of the article metering device.

In one example embodiment, after receiving the articles from an infeed single lane conveyor, a programmable robot is used to group the articles in a single row. The robot can be an industrial robot, such as an anthropomorphic robotic device or other device capable of handling and transporting (i.e., pushing) the row of articles to an array forming conveyor. The robot includes an end of arm pusher tool that handles and transports (i.e., pushes or slides) the row of articles to the array forming conveyor to form the article arrays. In some implementations, the robot contains a conveyor tracking feature that matches the speeds of the articles moving in the infeed single lane conveyor. As such, the article arrays are formed at a higher speed as compared to previous known speeds (i.e., 3.5 second/cycle). For instance, it has been proven to show cycle times as low as 1 second, constituting formation of the article arrays at high-speed. Furthermore, the present systems and methods employ an article metering device to meter the flow of articles, which exhibits a quicker and more efficient means to control the flow of articles in forming the article arrays.

For purposes herein, the terms "transported," "moved," "pushed" and the like in the context of the movement of articles may be used interchangeably.

The term "array," "article array," "article layer" and the like may be used interchangeably.

The terms "forming" "constructing" and "building" and the like as it pertains to any of arrays, article arrays and palletized articles may be used interchangeably.

The terms "a row of articles," "a first row of articles," "a second row of articles," and the like may generally refer to a single row of articles that forms an article array.

The term "machine direction" (MD) is used herein to refer to the direction of material or article flow through a process. In addition, relative placement and movement of a material or article can be described as travelling in the machine direction through a process from upstream in the process to downstream in the process.

Figure 1B:
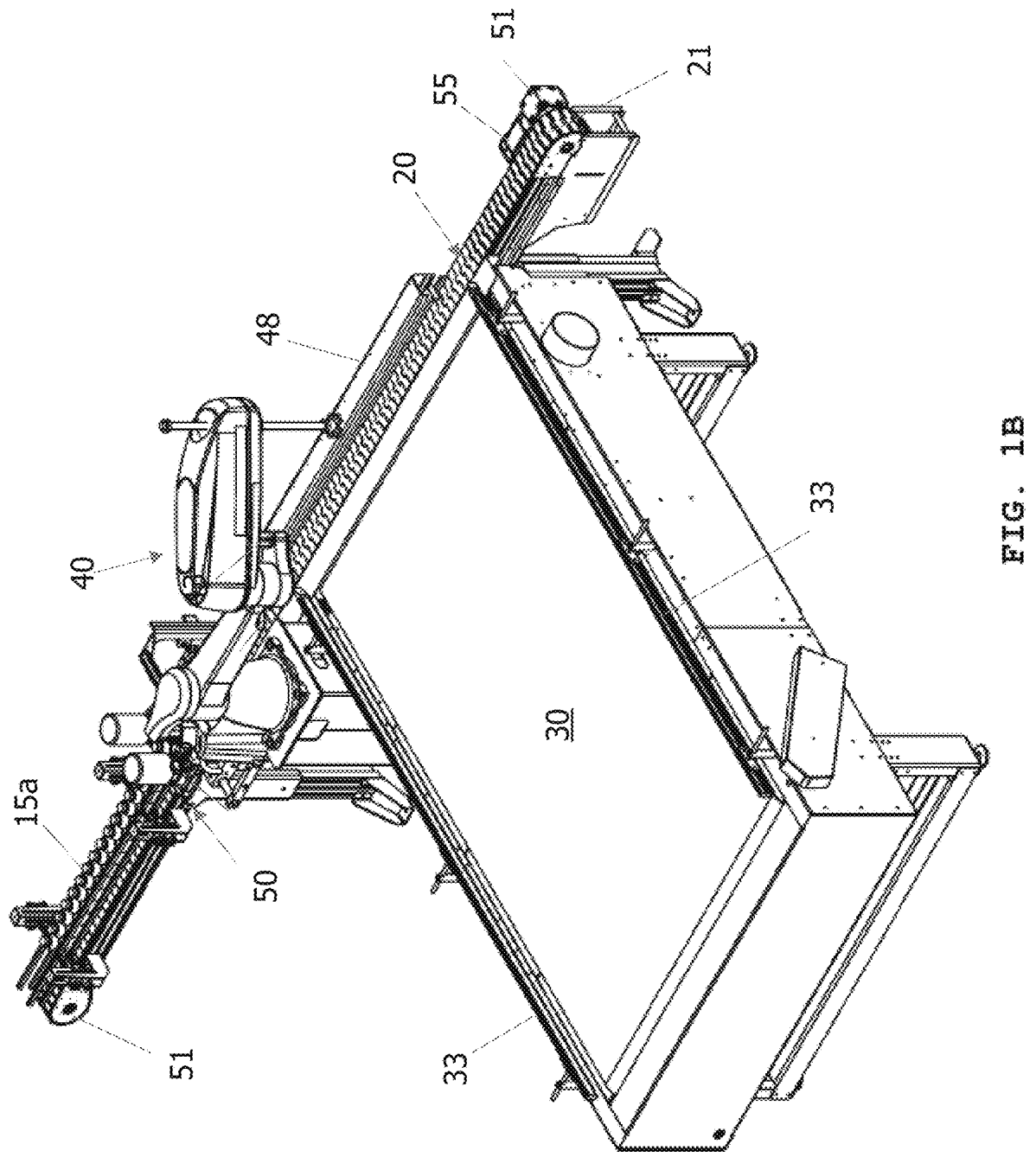
FIG. 1B is a perspective opposed view of an exemplary array former of FIG. 1A, according to an example embodiment of the present disclosure.
Figure 7A:
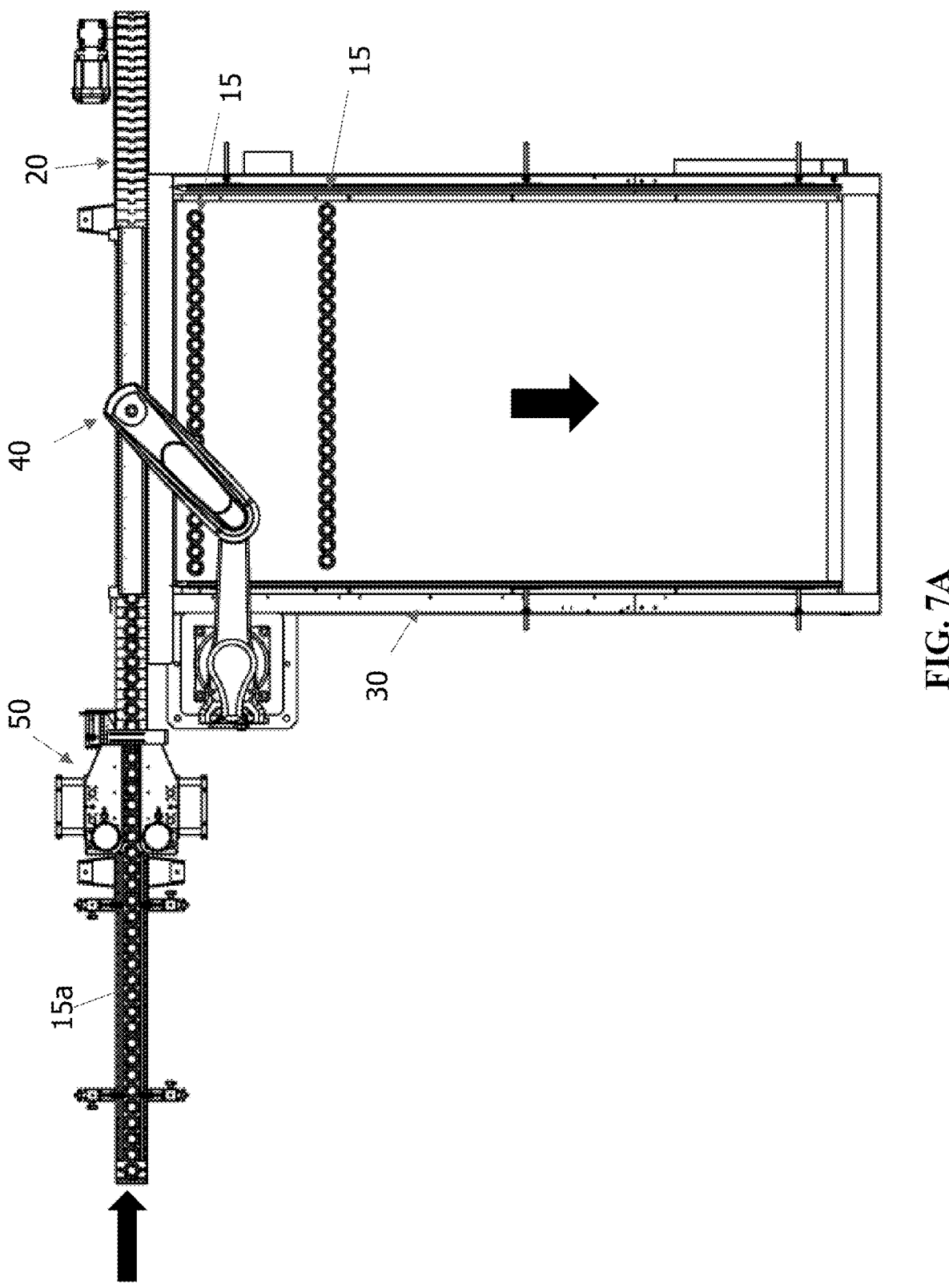
FIGS. 7A and 7B are top views of an exemplary array former, according to example embodiments of the present disclosure.
Figure 7B:
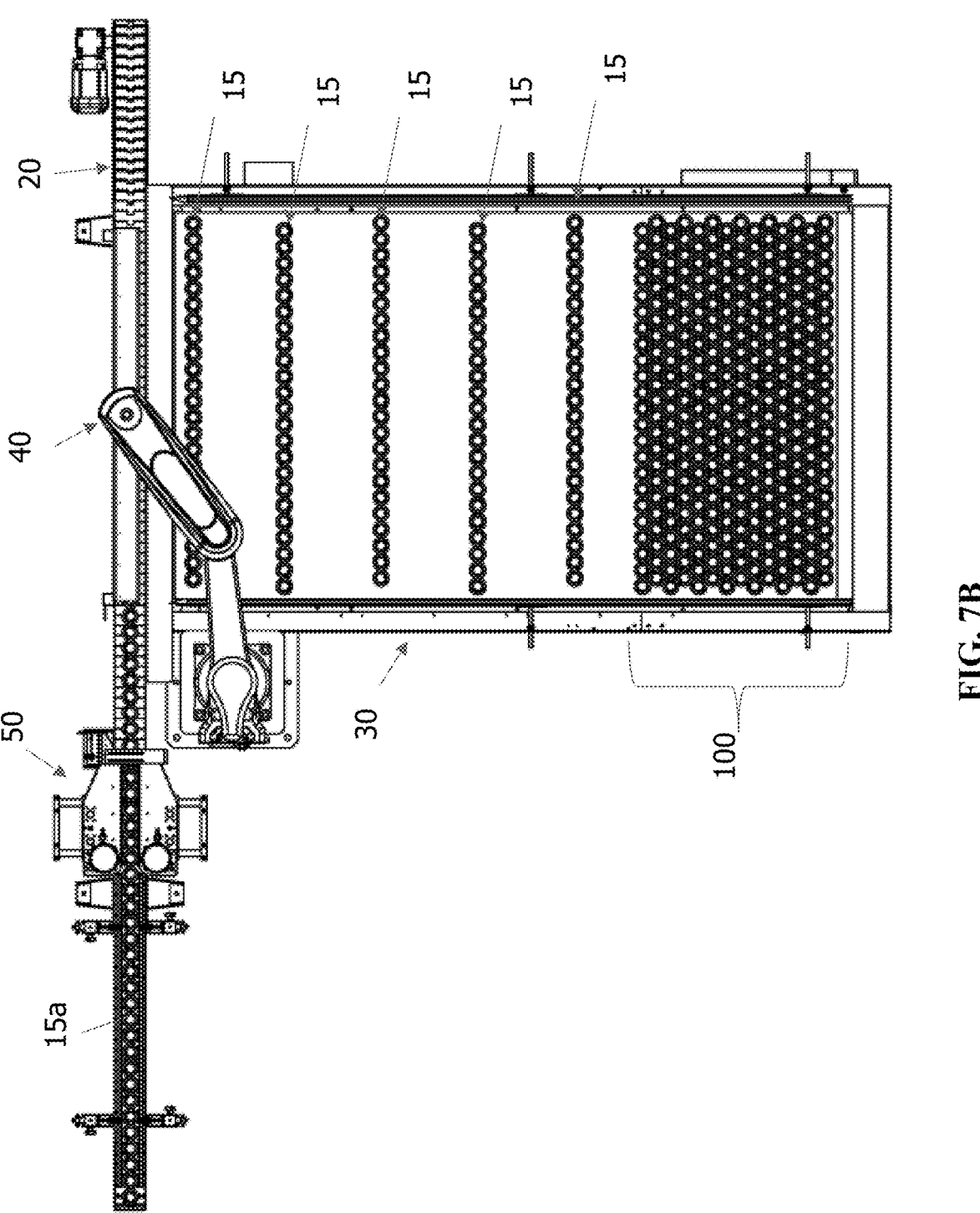

Referring to FIGS. 1A and 1B, an automated system 10 and method for forming (i.e., arranging, organizing, grouping) a row of articles 15 from a plurality of individual articles 15a (i.e., bottles, cans, or other types of containers) into an array of articles is shown. System 10 is arranged to continuously receive the individual articles 15a at high-speed on an infeed conveyor 20 to be transported. As shown, the infeed conveyor 20 is a single lane conveyor for moving the individual articles 15a in a single row. Unlike conventional conveyor systems, in order to achieve the similar high-speed formation as the present disclosure, those systems require plurality of infeed lanes typically 2 to 4 lanes, or more. In addition, unlike prior conveyor systems, a single lane infeed conveyor provides the footprint of conveyors forming the system to be minimized. In conjunction with the above infeed conveyor 20, system 10 further includes an array forming conveyor 30 for forming an array of articles 100 (as shown in FIG. 7B) to be bulk palletized, bagged or loaded into a box or pallet. The array forming conveyor 30 is configured to receive the individual articles 15a that were transported from the infeed conveyor 20 by a programmable robot 40 which groups the articles into a single row of articles 15 (as shown in FIG. 7B) and eventually forming the array of articles 100, which will be described in detail later. As shown, the array forming conveyor 30 includes siderails 33 at each side portion thereof to contain and group the rows of articles 15 within an assembly area of the array forming conveyor 30. In some implementations, the array forming conveyor 30 can be a vacuum conveyor including vacuum or suction equipment coupled to a vacuum source (not shown) to hold or sustain the articles on a top surface of the array forming conveyor 30.

In some implementations, the programmable robot 40 can be an industrial robot, such as an anthropomorphic robotic device or a Selective Compliance Assembly Robot Arm (SCARA), or other device capable of handling and transporting (i.e., pushing or sliding) the row of articles 15 to the array forming conveyor 30. As shown, the robot 40 is mounted on a rotary axis 41, attached to a base 42, that is configured to rotate 360 degrees about its axis. As such, the robot 40 is a multi-axis robot having at least four axes of motion. The robot 40 includes a cantilevered arm 43 extending from the rotary axis 41 and supporting a robot head 45. At the distal end of the robot head 45, an end of arm tool (EOAT) pusher 48 is attached thereto to receive and move (or push) the articles 15 onto the array forming conveyor 30. In other implementations, although not shown, the robot head 45 can be attached to a rotary axis rotating 360 degrees about its axis, driven by a motor, e.g., AC motor, DC motor, or servo motor. This permits the robot head 45 to correspondingly rotate 360 degrees.

In some implementations, the robot 40 is programmable so as to be fully integrated with the conveyors 20, 30 for speed control. For instance, the robot 40 can contain a conveyor tracking element that tracks the speed of the infeed conveyor 20 and the array forming conveyor 30 and controls the sliding motion of the pusher 48 to match the speed of the infeed conveyor 20 and/or the array forming conveyor 30, which will be described in detail later. This enables the robot 40 to accurately and precisely move the articles 15a to the array forming conveyor 30 at high-speed.

As shown, the pusher 48 is an elongated member, extending in the same direction as the infeed conveyor 20, that is configured to receive and contain a predetermined amount of articles 15a. A length of the pusher 48 can be of varying length, holding varies amount of articles, depending on the application. By way of example only, the pusher 48 is designed to hold 5, 10, 15, 20 or more articles.

Figure 4A:
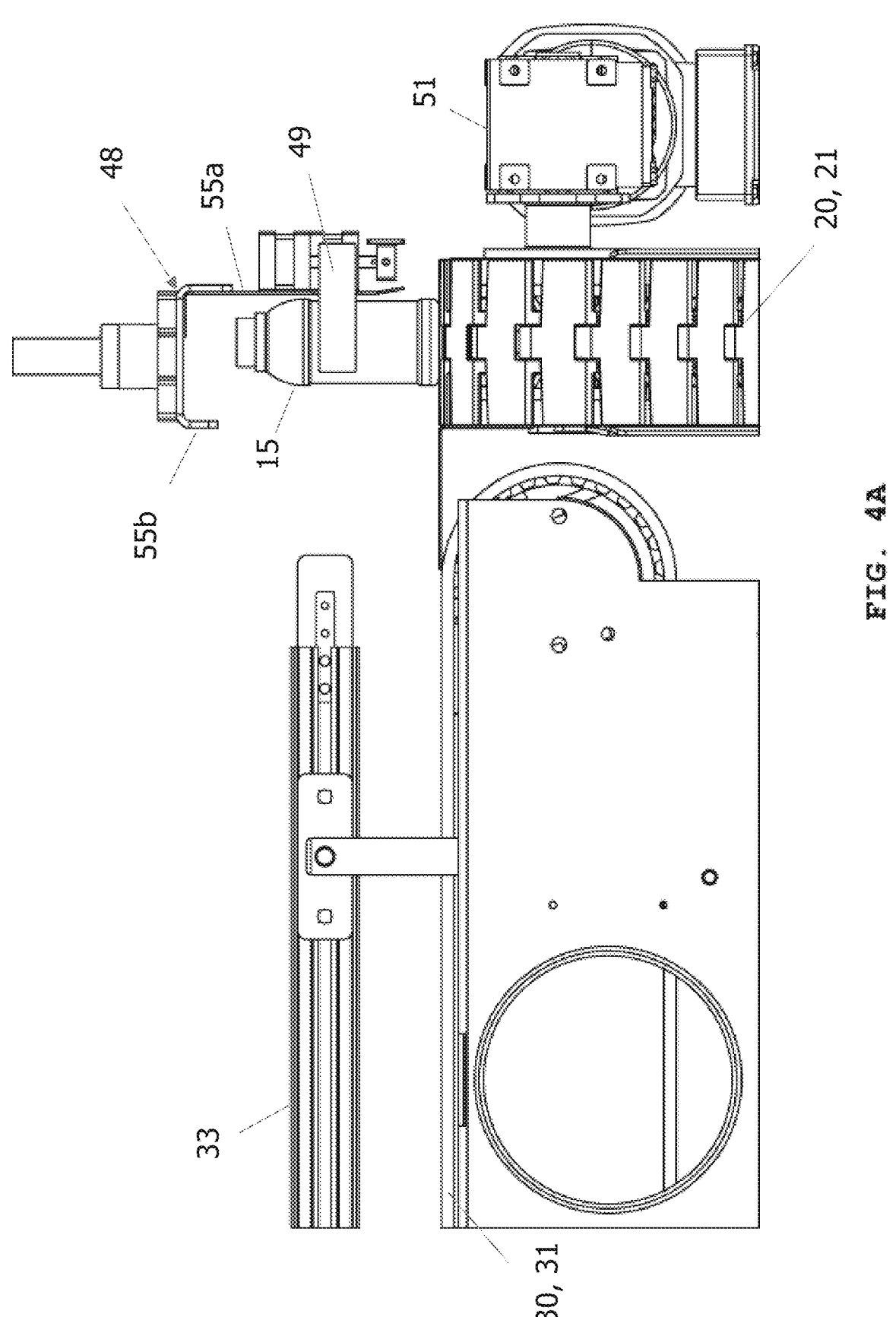
FIGS. 4A and 4B are perspective side views of an exemplary robot head forming a row of articles, according to example embodiments of the present disclosure.
Figure 4B:
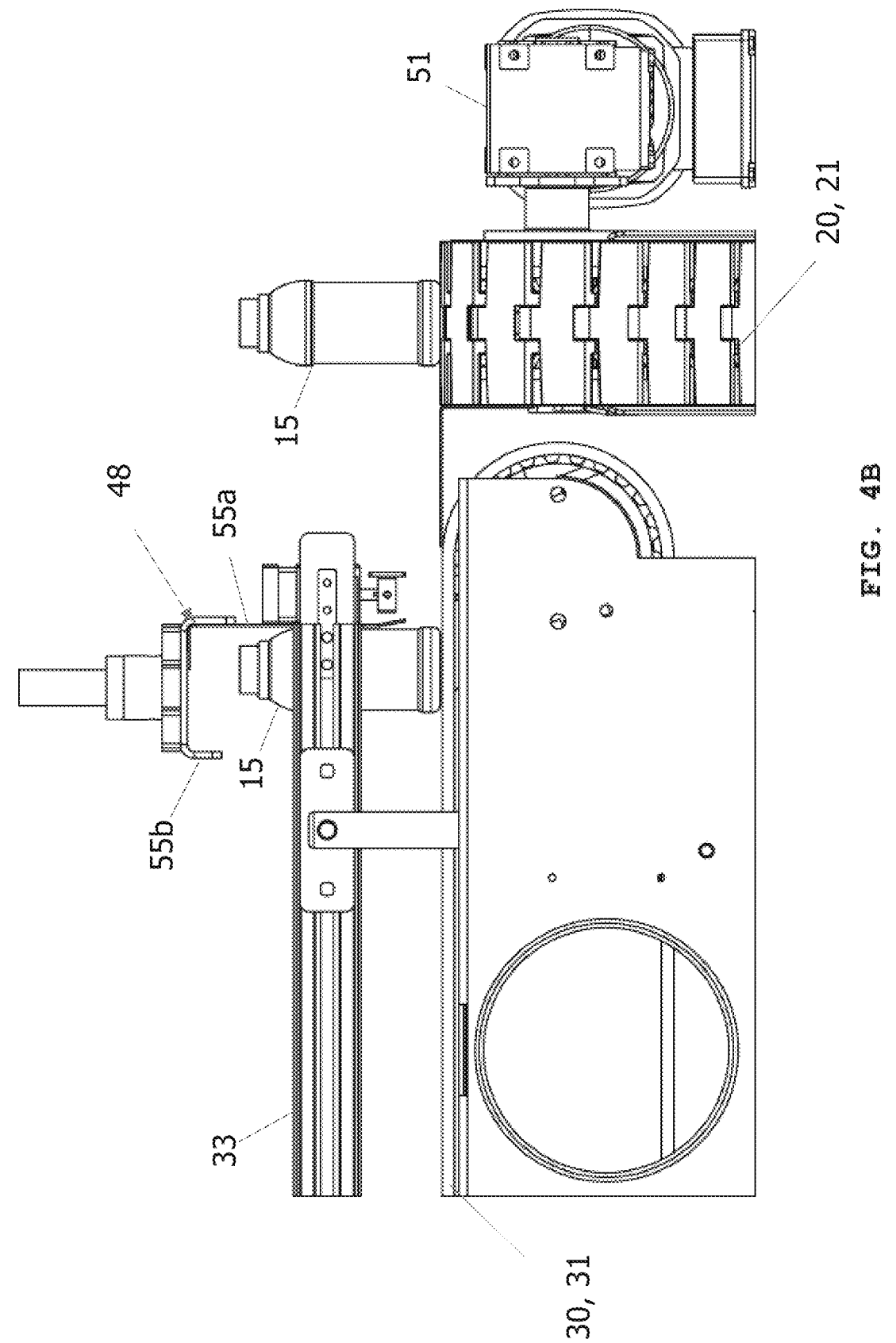

Referring now to FIGS. 4A and 4B, the pusher 48 includes a first portion 55a and a second portion 55b for receiving the articles 15a. The second portion 55b is above the first portion 55a. To described differently, the first portion 55a is configured to substantially receive a body portion of the article 15a and the second portion 15b is configured to substantially receive a neck portion of the article 15a. As shown, the first and second portions 55a, 55b are integrally attached to each other. In one implementation, the first and second portions 55a, 55b are attached via welding, for example. Other attachment methods, such as, but not limited to, riveting, soldering, adhesive, fasteners, i.e., screws, bolts, can be employed. In some implementations, as shown in FIGS. 4A and 4B, the second portion 55b is substantially (inverted) U-shaped. This shape enables the articles 15a to be easily received and prevents the articles 15a from tipping from the infeed conveyor 20 when receiving the articles 15a and/or during transport of the row of articles 15 to the array forming conveyor 30. It should be appreciated that the second portion 55b can be of other shapes, such as, for example, (inverted) J-shaped, C-shaped, (inverted) V-shaped, etc. In other implementations, there may not be the second portion 50 and only the first portion 55a, forming a planar, flat surface thereof. In this implementation, the planar, flat surface first portion 55a is configured to receive generally taller and/or thinner articles 15a.

As further shown in FIGS. 4A and 4B, the pusher 48 includes an end stop 49 at a downstream end of the pusher 48. The end stop 49 engages and stops a first article 15a in a first row of articles 15. Once the first row of articles 15 is pushed to the array forming conveyor 30 by the pusher 48, the pusher 48 then returns to its initial position whereby the end stop 49 engages and stops another first article 15a for a second row of articles 15. This step is repeated until a complete array of article 100 is formed. Accordingly, the end stop 49 acts as a stop member between each row of articles 15.

Figure 11A:
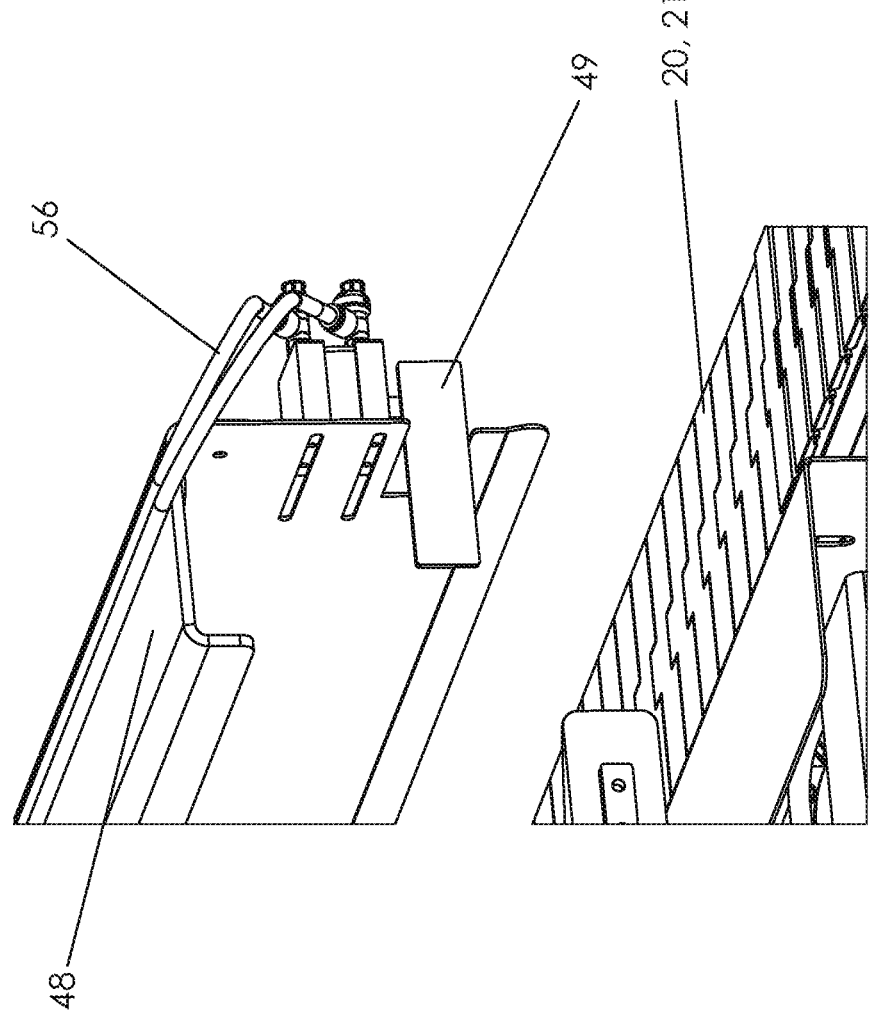
FIG. 11A is a perspective end view of an end of tool arm with an end stop in an extended state, according to an example embodiment of the present disclosure.
Figure 11B:
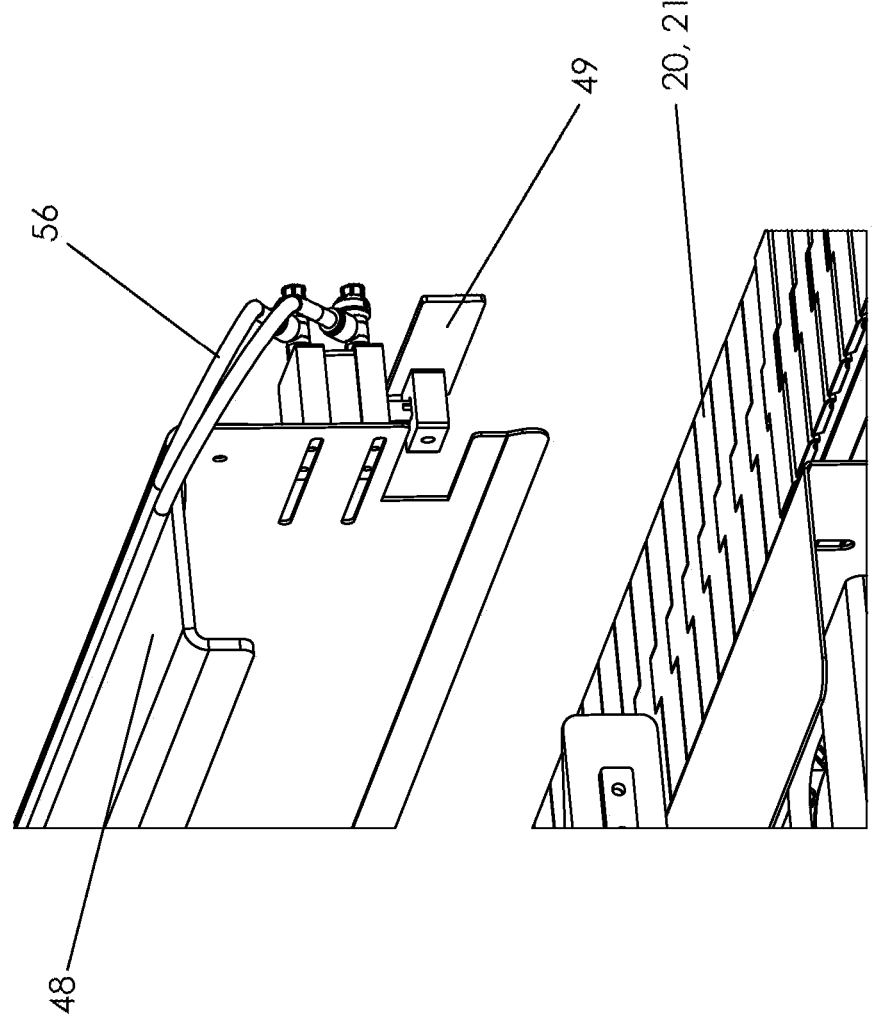
FIG. 11B is a perspective end view of an end of tool arm with an end stop in a retracted state, according to an example embodiment of the present disclosure.

In some implementations, as shown in FIGS. 11A and 11B, the end stop 49 can be in an extended state or a retracted state, respectively. In other words, the end stop 49 can be in an extended (un-retracted) position (FIG. 11A) to stop the first article 15a and forming a row of articles 15 or the end stop can be in a retracted position (FIG. 11B) permitting the articles 15a to pass through. Moreover, the end stop 49 allows the articles 15a to be purged while the pusher 48 is in the initial position. In some implementations, the end stop 49 is driven by a rotary actuator 55, such as a pneumatic actuator connected to a pressurized air source (not shown) via tubing 56. It should be appreciated that other mechanisms, such as, for example, hydraulic or electric, can be employed to control the actuator 55.

Figure 12:
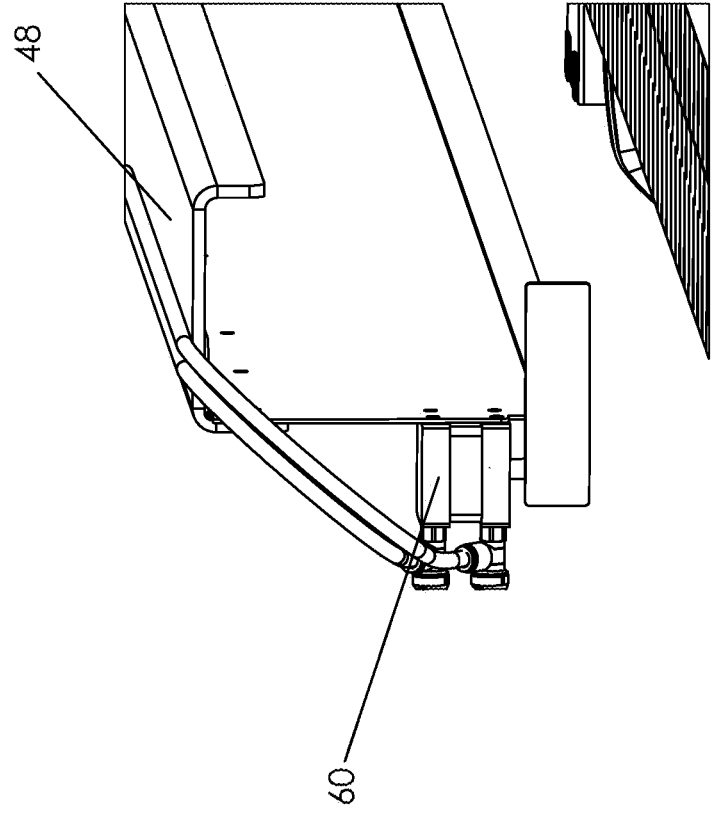
FIG. 12 is a perspective end view of an end of tool arm with a rotary actuator, according to an example embodiment of the present disclosure.

In some implementations, as shown in FIG. 12, the pusher 48 may include a containment arm 60 mounted at an upstream end of the pusher 48. The containment arm 60 is configured to translate (move) towards the articles once the row of articles 15 is formed to hold the articles together for less stable articles and prevent tipping of the row from getting separated. That is, the containment arm 60 exerts sufficient pressure against the articles to hold the entire formed row of articles 15 in place during transport to the array forming conveyor 30 for assembly. In some implementations, the containment arm 60 is driven by a rotary actuator 65, such as a pneumatic actuator connected to a pressurized air source (not shown) via tubing 67. It should be appreciated that other mechanisms, such as, for example, hydraulic or electric, can be employed to control the rotary actuator 60.

Figure 2:
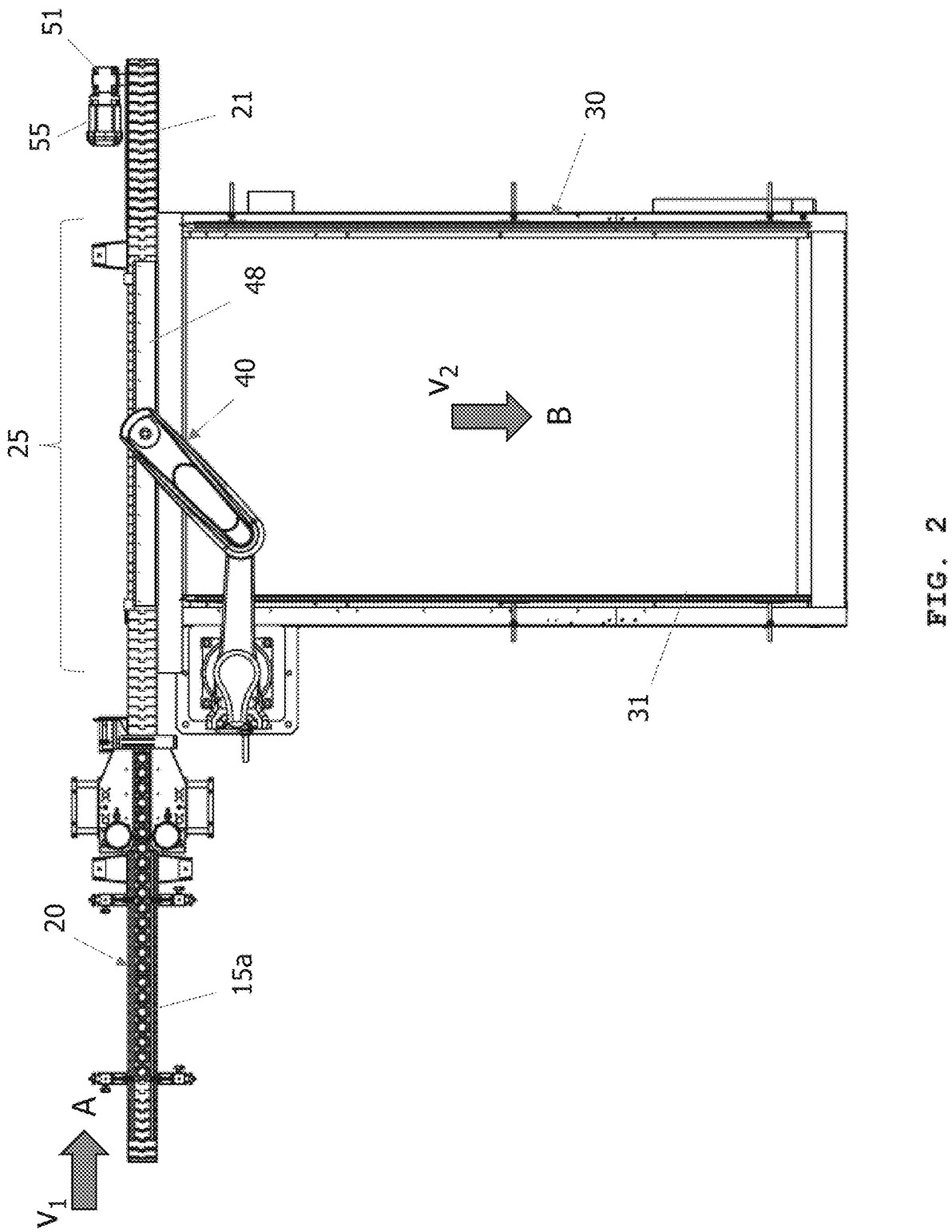
FIG. 2 is a plan view of an exemplary array former, according to an example embodiment of the present disclosure.

Referring now to FIG. 2, the infeed conveyor 20 includes a conveyor belt 21, controlled by motors 51, that moves in a first direction (indicated by arrow "A"). As such, the conveyor belt 21 causes the articles 15a to move or advance in direction "A." Once the articles 15a is in a sweeping area 25 (which includes an entire width area of the array forming conveyor 30 and slightly beyond), the robot 40 having captured and formed a row of articles 15 pushes the row of articles 15 towards the array forming conveyor 30 moving in a second direction (indicated by arrow "B") to commence building an array of articles 100 (FIG. 7B). As shown, direction "B" is orthogonal in relation to direction "A". Similarly, the array forming conveyor 30 also includes a conveyor belt 31, controlled by a motor(s) (not shown), to move the rows of articles 15 along a surface of the array forming conveyor 30 for building the array 100 for further packaging.

Figure 3:
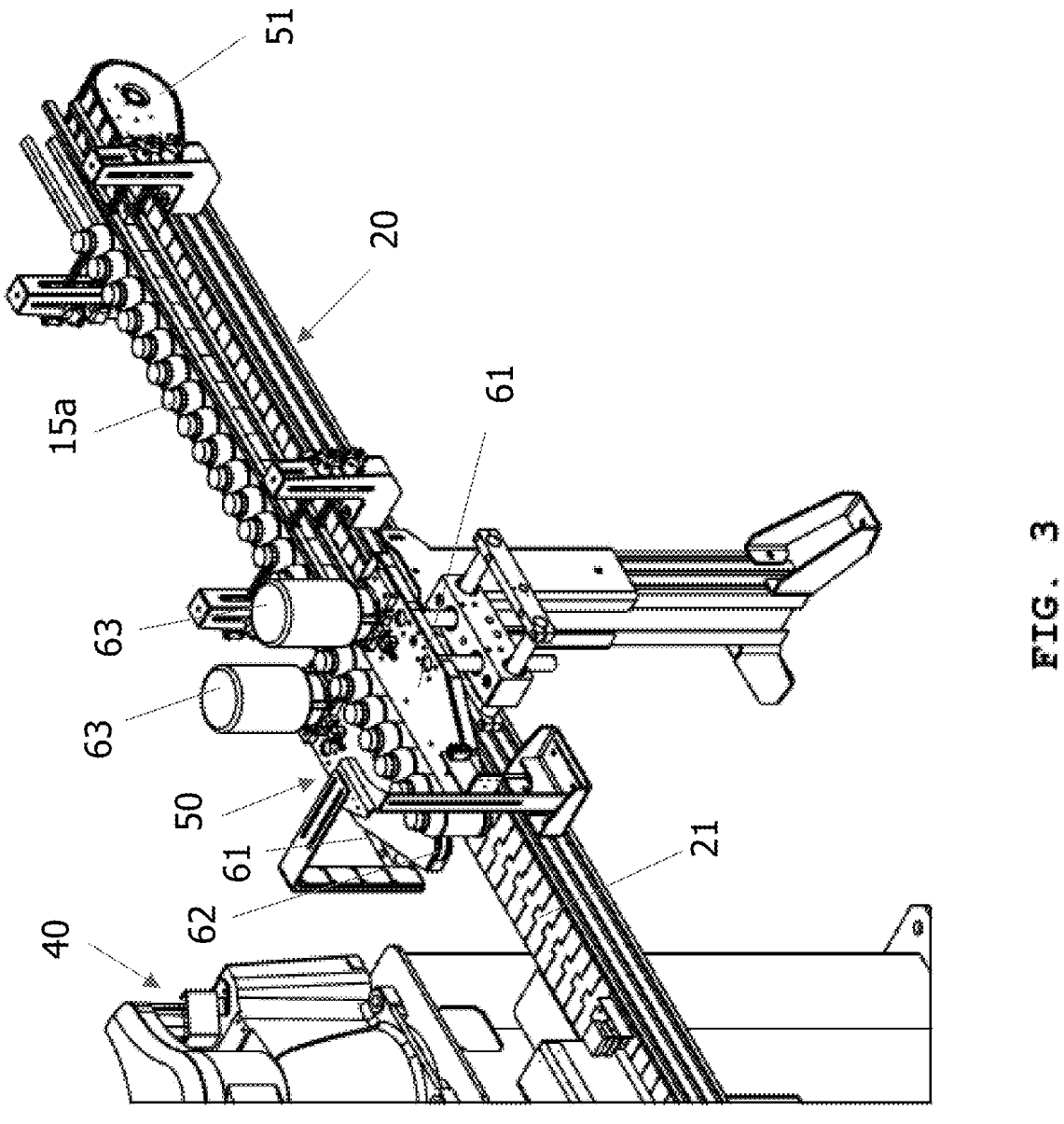
FIG. 3 is a partial perspective view of an exemplary infeed conveyor, according to an example embodiment of the present disclosure.

As shown in FIG. 3, the infeed conveyor 20 includes an article metering device 50 (i.e., throttle) that controls the flow of articles in the infeed conveyor 20, more specifically, the sweeping area 25 of the infeed conveyor 20. An exemplary article metering device is disclosed in U.S. Pat. No. 8,783,447, entitled "Article Metering Device," incorporated herein by reference. The article metering device 50 can be controlled to increase or decrease or pause the flow of articles, depending on the application. In one operation, when a count for forming a row of articles 15 is completed, the article metering device 50 controls the flow of articles to slow-down (or slight reduced speed) or to some extent pause to create a separation (or spacing) between each row of articles 15. In other operations, the article metering device 50 controls the flow of articles by increasing or decreasing to match the speed of the infeed conveyors 20 to enable a continuous flow.

Figure 8:
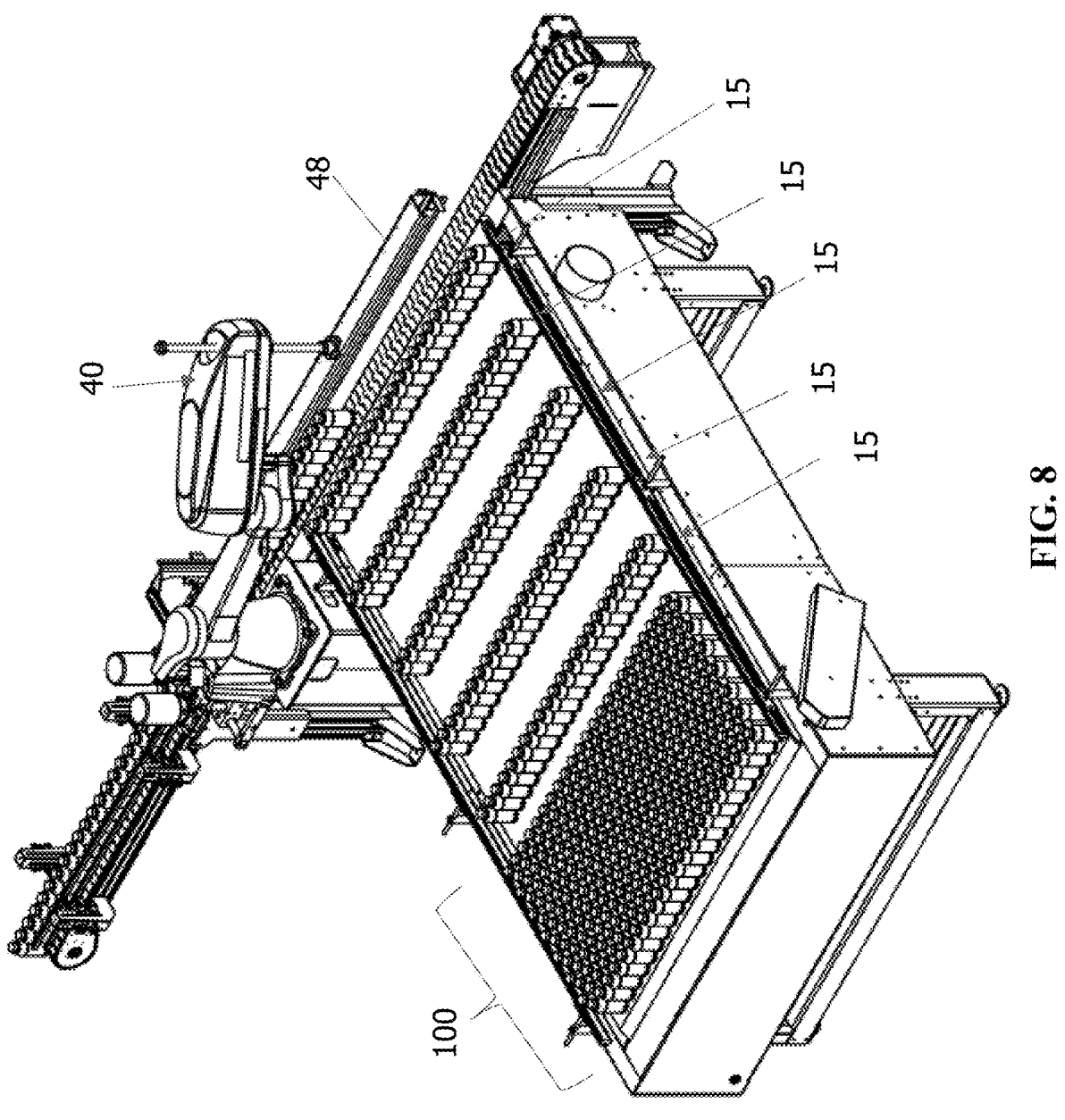
FIG. 8 is a perspective view of an exemplary array former with a formed array of articles, according to an example embodiment of the present disclosure.

The article metering device 50 is composed of two engagement bodies 61 surrounding the infeed conveyor 20 orthogonal to the direction of the infeed conveyor 20 to engage the articles 15a. Each engagement body 61 includes a continuous belt 62 rotating within the engagement body 62 and is configured to engage the articles 15a. That is, due to the belt 62 engaging a surface of the articles 15a by direct contact, the rotating belt 62 can control the flow of the articles either by slowing down or pausing the flow of articles. The belt 62 is controlled by a motor 63 where it can be an independent servo, or other variable speed motor. A controller (not shown) connected to each motor 63 provides the speed of the rotating belt 62 in order to coordinate the operation of the flow of the articles. This enables a continuous flow of forming a plurality of rows of articles 15 without stoppage, as illustrated by FIG. 8. Unlike conventional systems, these systems significantly slow down or completely stop prior to the articles being transported or moved to a conveyor for forming the array, causing substantial increase in production and assembly time.

At or near the downstream end of the infeed conveyor 20, an encoder 55 (FIG. 1A) is provided. The encoder 55 is adapted to provide information about an electric motor shaft's speed and/or position. In some implementations, the motor encoder 55 is most commonly magnetic or optical and produce signals that are either incremental or absolute. A controller (not shown) controls the motors 51, and the encoder 55 provides constant pulse input to the controller in order, in other implementations other devices can be used to monitor conveyor speed, to constantly coordinate the operation of the infeed conveyor 20 and/or the array forming conveyor 30.

In some implementations, the motors 51 can be an independent servo, or other variable speed motor. In an example embodiment, the encoder 55 can directly monitor the movement of the infeed conveyor 20 providing the appropriate inputs to the controller. As thus configured as an independent, stand-alone unit including the conveyors 20, 30, virtually any packaging or similar processing machine requiring precise phasing and speed control of articles, can be retrofitted by the system 10 of the present invention.

For example, once the row of articles 15 has entered the upstream boundary of the infeed conveyor 20, the robot 40 will begin tracking the row of article 15 location on the fly. The encoder 55 allows the robot 40 to match the speed with the infeed conveyor 20 permitting the row of articles 15 to have a continuous motion. When the pusher 48 has contained and formed the row of articles 15, the robot 40 will sweep the row of articles 15 onto the array forming conveyor 30. In conjunction, the robot 40 matches the speed (in 90 degrees different direction of flow) with the array forming conveyor 30 using an input reading from the speed of the array forming conveyor 30 in direction B. While the robot 40 is sweeping onto the array forming conveyor 30, the next row of articles 15 is being fed towards the sweep area 25 simultaneously. The system 10 can run at very high speeds from a single infeed conveyor 20 compared to the other conventional system shown that have to use multiple infeed conveyors to achieve similar speeds.

Moreover, the encoder 55 is configured to detect the speeds, e.g., $V_1$ of the infeed conveyor 20 and/or $V_2$ of the array forming conveyor 30. In other implementations, there may be multiple encoders to monitor the speed. For example, one encoder mounted on the infeed conveyor motor can monitor the infeed conveyor speed for feedback, and another encoder mounted on the array forming conveyor motor to get that feedback. In one implementation, the infeed conveyor 20 runs at a constant (higher) speed and the array forming conveyor 30 runs at a different constant (lower) speed. If the system is out of phase, the article metering device 50 will stop the flow of articles 15a and the articles 15a will be purged off the end of the infeed conveyor 20. As the row of articles 15 moves to the array forming conveyor 30, the article metering device 50 will decelerate or temporarily stop to create the gap of a subsequent row of articles. In general, the velocity of $V_1$ and $V_2$ do not need to be equal and will likely not be equal. In most cases, the velocity $V_1$ of the infeed conveyor 20 will be higher than the velocity $V_2$ of the array forming conveyor 30.

Moreover, the encoder 55 is configured to detect the travel movement, via the speed of the infeed conveyor 20, of the articles as they move along the flow path A. If the article is out of phase, such as in a position along the flow path A before or after where it should be, then the article metering device 50 will stop the flow of articles and articles will be purged off the end of the infeed conveyor 20. As the row of articles moves to the array forming conveyor 30, the article metering device 50 will decelerate or temporarily stop to create the gap between the row of articles 15. In one implementation, the present system has demonstrated and proven cycle times as low as 1 second.

Figure 5:
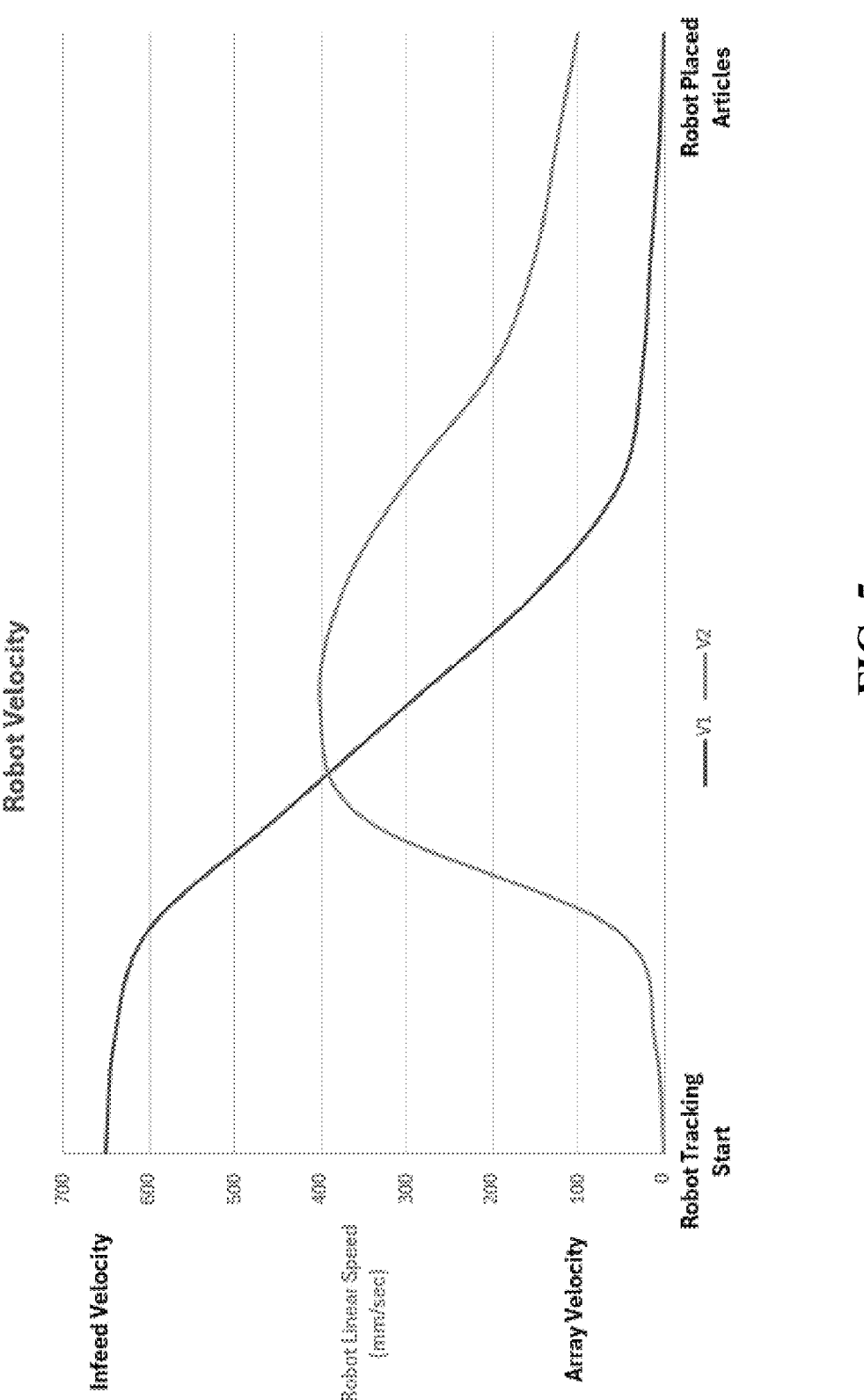
FIG. 5 is a graph illustrating a robot velocity associated with infeed conveyor velocity and array forming conveyor velocity, according to an example embodiment of the present disclosure.

FIG. 5 depicts a graph illustrating an exemplary robot velocity associated with $V_1$ and $V_2$ for one cycle time. As shown, the robot 40 starts tracking on the infeed at $V_1$=650 mm/sec and $V_2$=0 mm/sec. Accordingly, the infeed conveyor 20 is moving at 650 mm/sec. During tracking, the robot 40 is following the speed of the infeed conveyor 20 so its speed is still very high in $V_1$ and low in $V_2$. Once the robot 40 via the pusher 48 has contained the articles 15, its biggest priority is moving the articles off the infeed conveyor 20 so the next row can infeed. As such, there is a quick increase in $V_2$ speed and a steady to quick decrease in $V_1$ speed. As shown, for example, the robot 40 gets up to approximately 400 mm/s in the $V_2$ velocity before it starts to slow down and match the speed of the array forming conveyor 30 (100 mm/sec). When the row of articles 15 is released, the robot 40 is not moving in the direction of the infeed conveyor ($V_1$=0) and matches the speed of the array forming conveyor ($V_2$=100 mm/sec).

It is to be understood that the operation and movement of associated components, including the speed of the infeed conveyor 20, the array forming conveyor 30 and/or the robot 40 can be controlled by a processor or control device or controller, operating in a known manner, and is driven by any appropriate drive mechanism known in the art, and not limited to those disclosed herein.

Figure 6A:
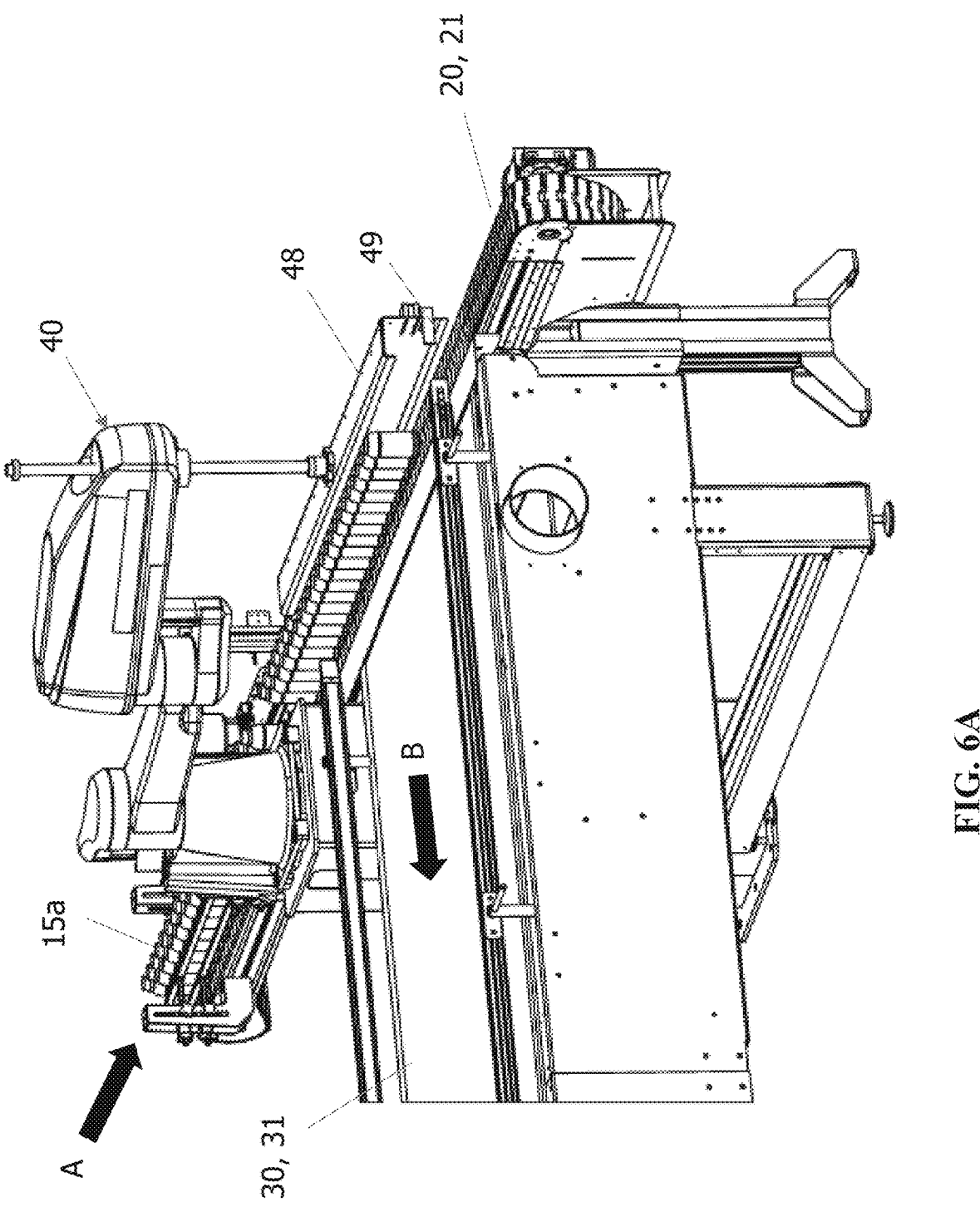
FIGS. 6A-6F are perspective views of an exemplary system of forming an array, according to example embodiments of the present disclosure.
Figure 6B:
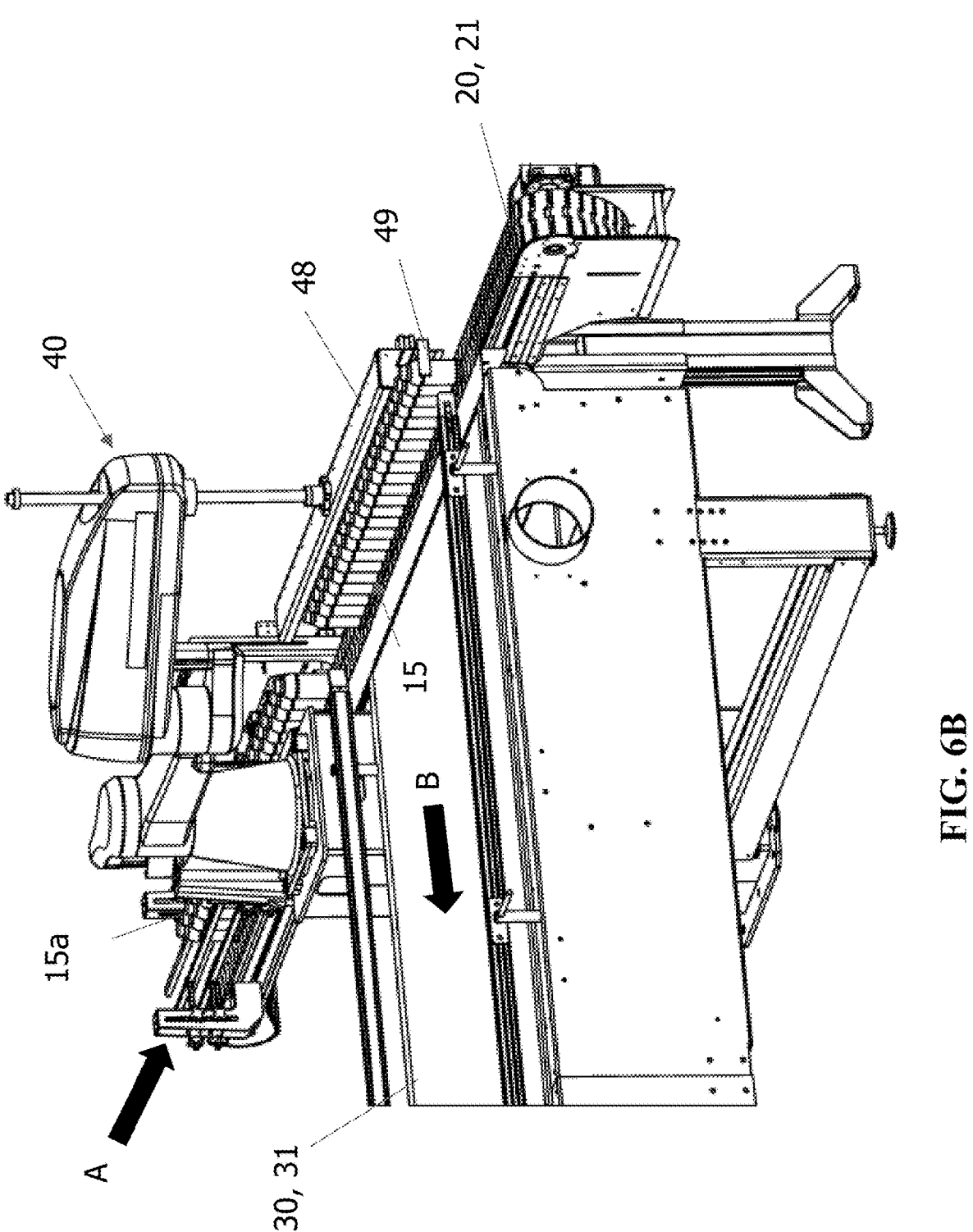
Figure 6C:
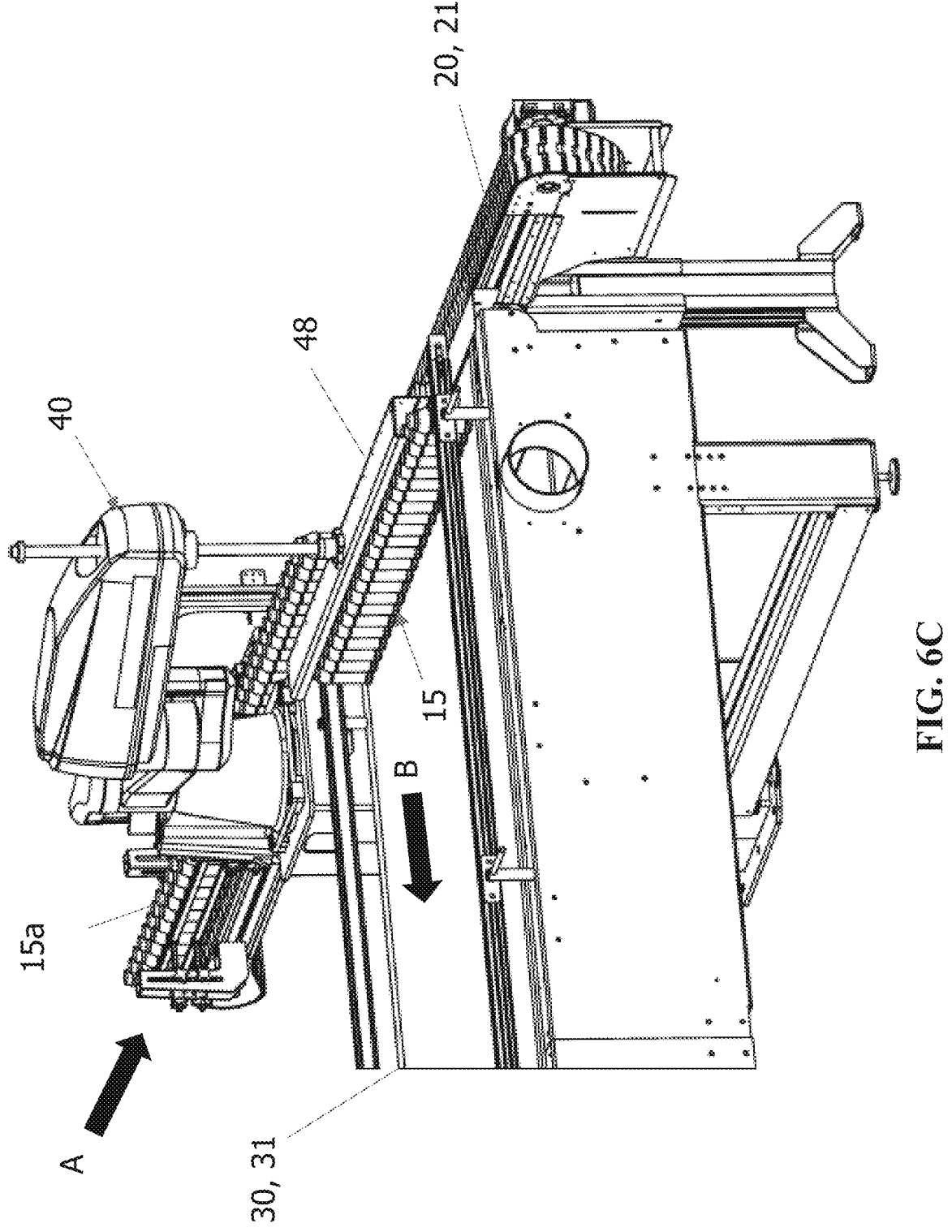
Figure 6D:
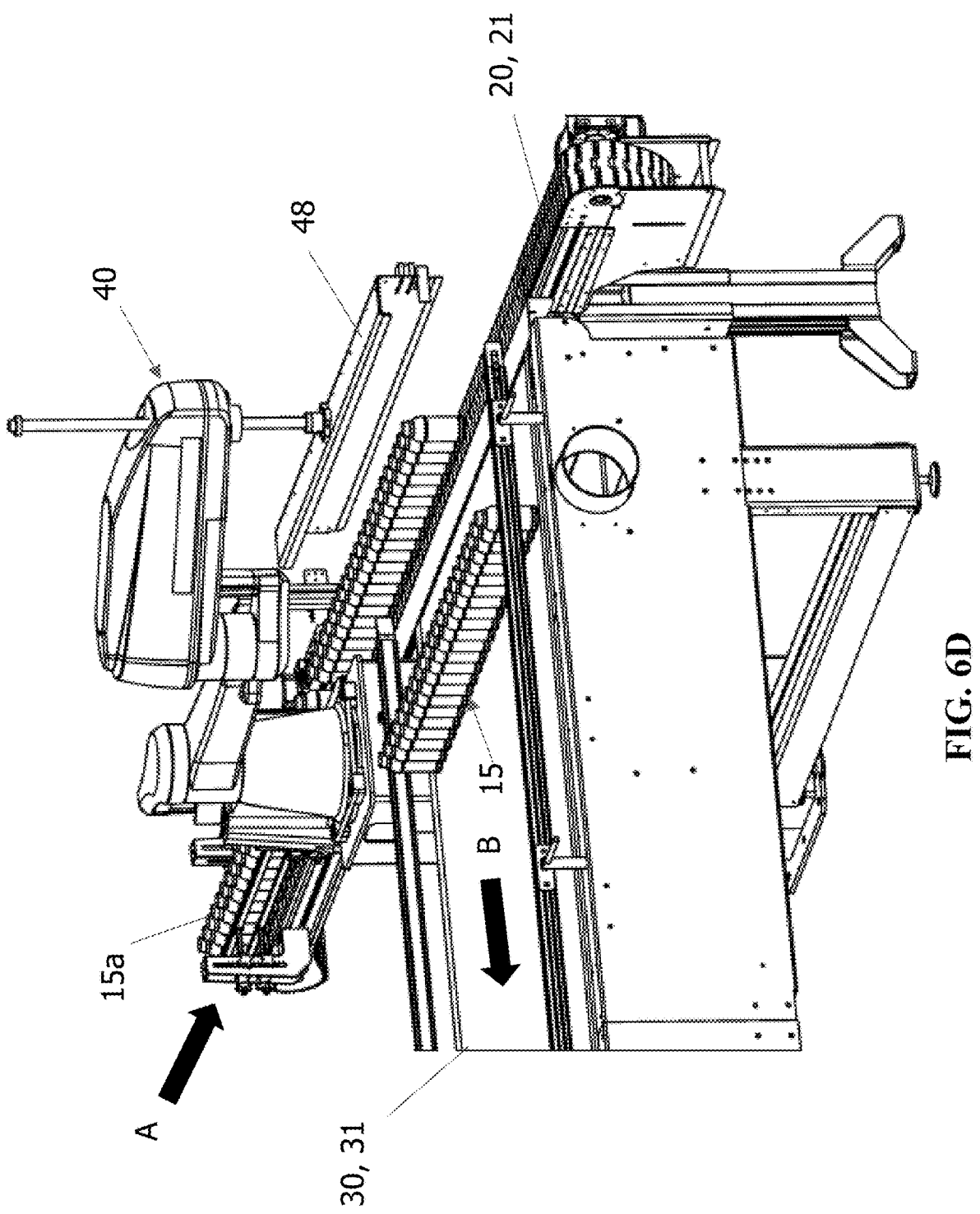
Figure 6E:
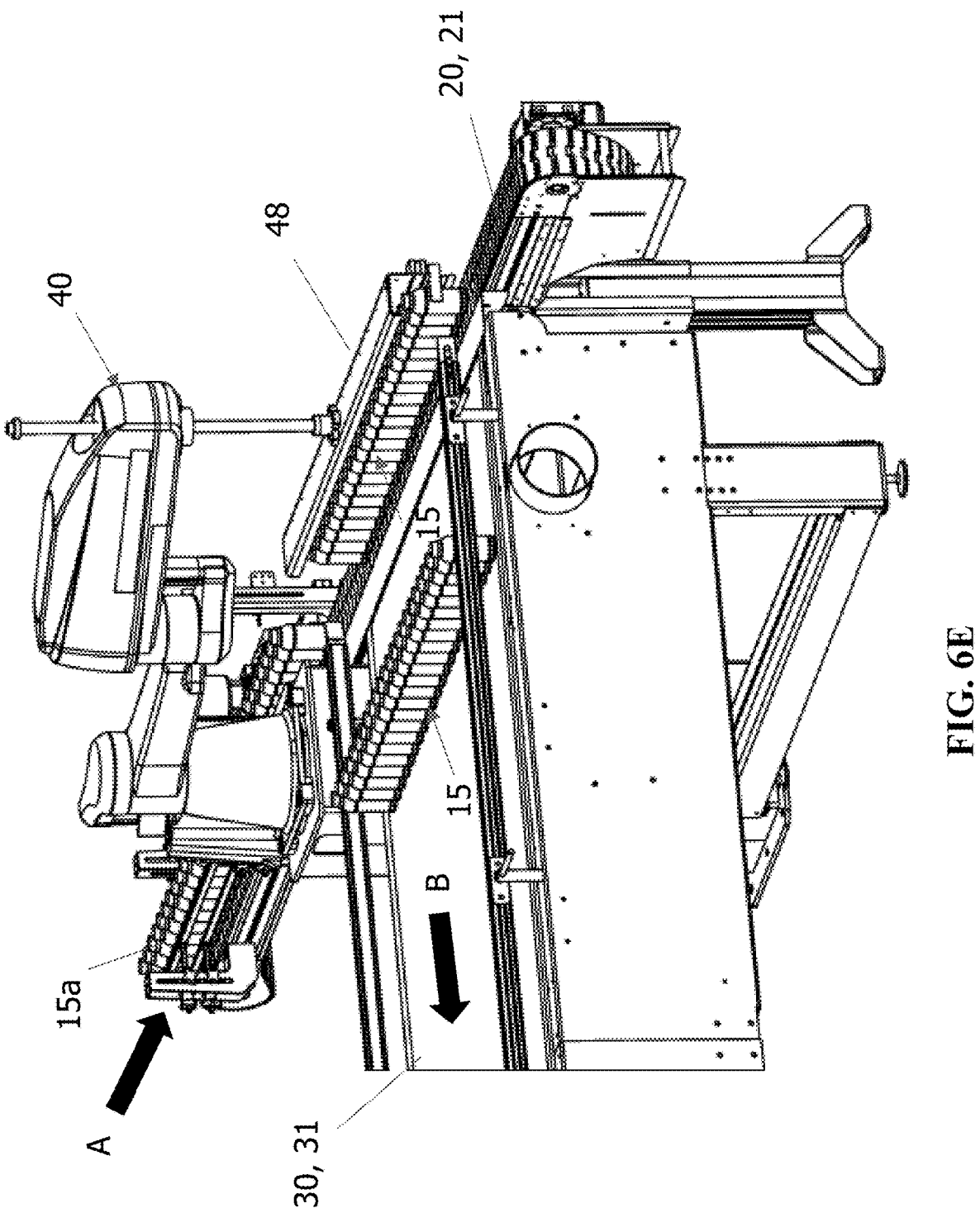
Figure 6F:
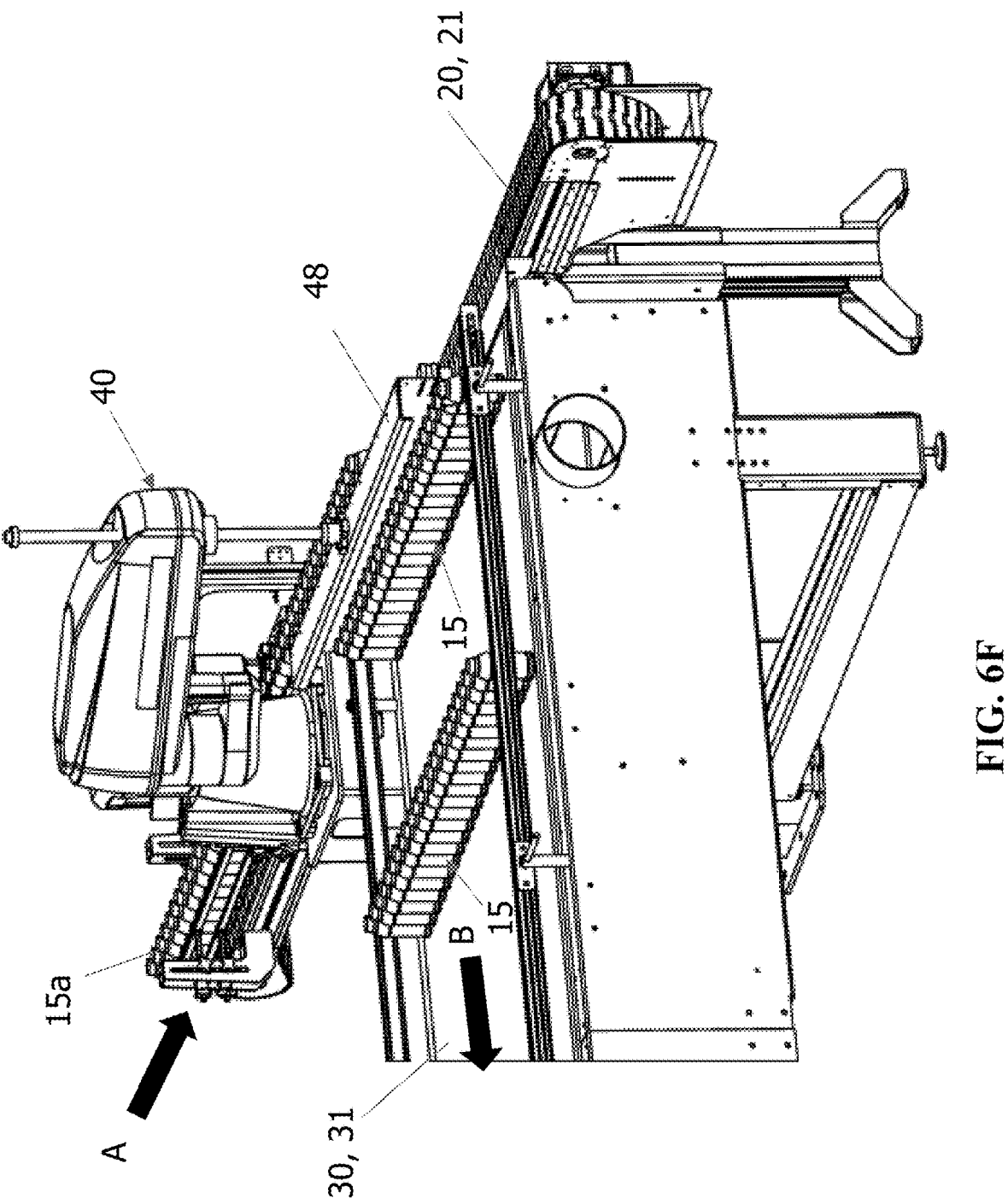

In operation, and with specific reference to FIGS. 6A-6F, it can be seen that a plurality of articles 15a, moving along flow path A on the infeed conveyor 20, is arriving to the sweeping area 25 of the array forming conveyor 30. At this location, the pusher arm 48 of the robot 40 is in its initial position to receive the incoming articles 15a (FIG. 6B). Due to the end stop 49 provided at a downstream end of the pusher arm 48, a predetermined number of incoming articles 15a is captured to form a row of article 15. Then moving onto the array forming conveyor 30, the pusher arm 48 slides or pushes the formed row of article 15 onto the array forming conveyor 30 in direction B (FIG. 6C). As discussed above, at this point, the motion speed of the robot 40 and the speed of the infeed conveyor 20 are properly controlled such that the speed match. That is, the robot 40 is considered to be in phase and properly controlled as to speed with regard the speed of the infeed conveyor 20 so as to provide a smooth, continuous operation. Once the row of articles 15 is traveling along the array forming conveyor 30 to build the array 100 towards an end portion of the array forming conveyor 30, the pusher arm 48 returns back to its initial position for receiving the subsequent incoming articles 15a (FIG. 6D). As similar to the step of FIG. 6B, the pusher arm 48, by the end stop 49, collects another predetermined number of incoming articles 15a to form a subsequent row of article 15 (FIG. 6E). These steps are repeated until a predetermined amount rows of articles is formed to build the array 100.

Figure 9A:
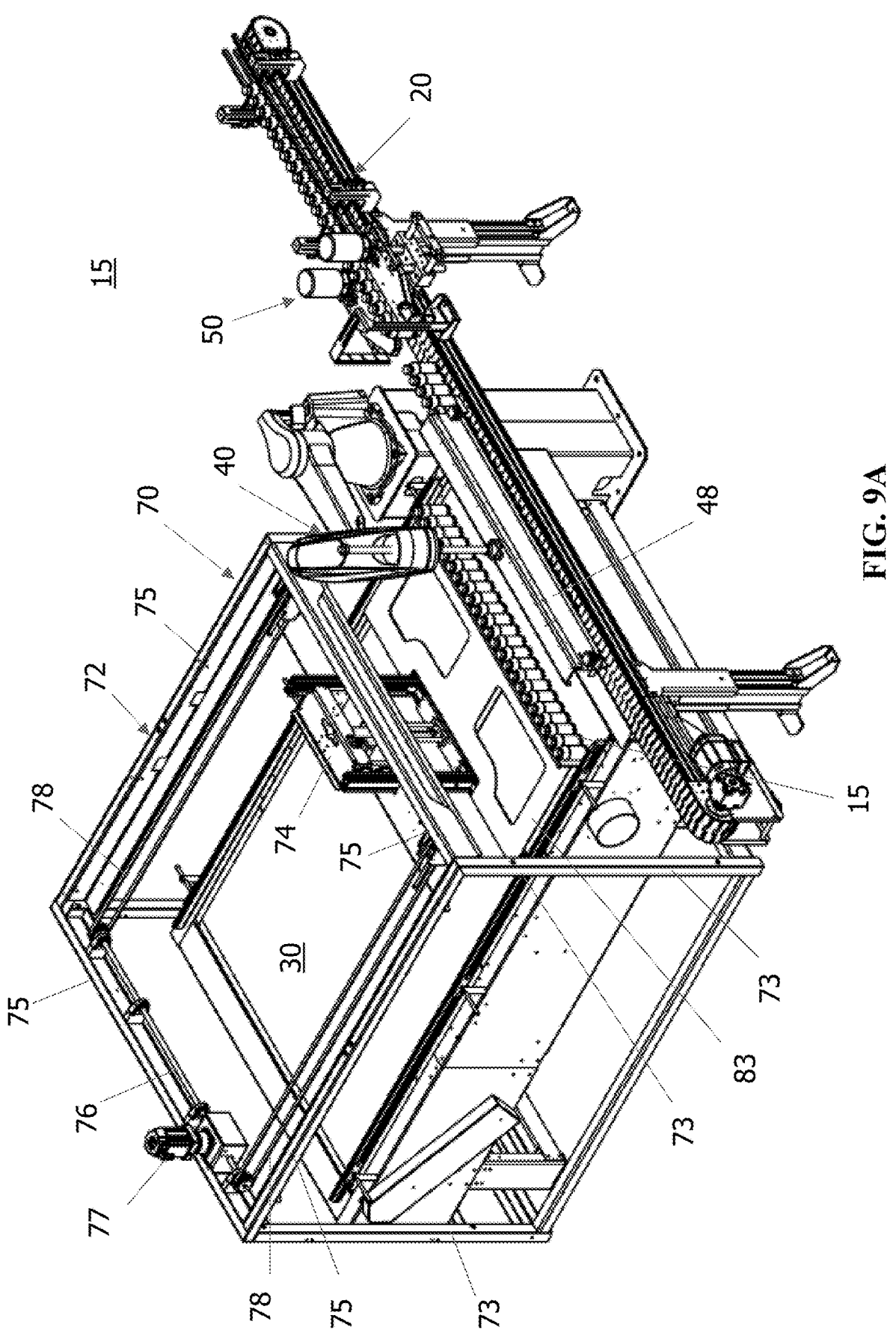
FIGS. 9A and 9B are perspective views of another exemplary array former, according to an example embodiment of the present disclosure.
Figure 9B:
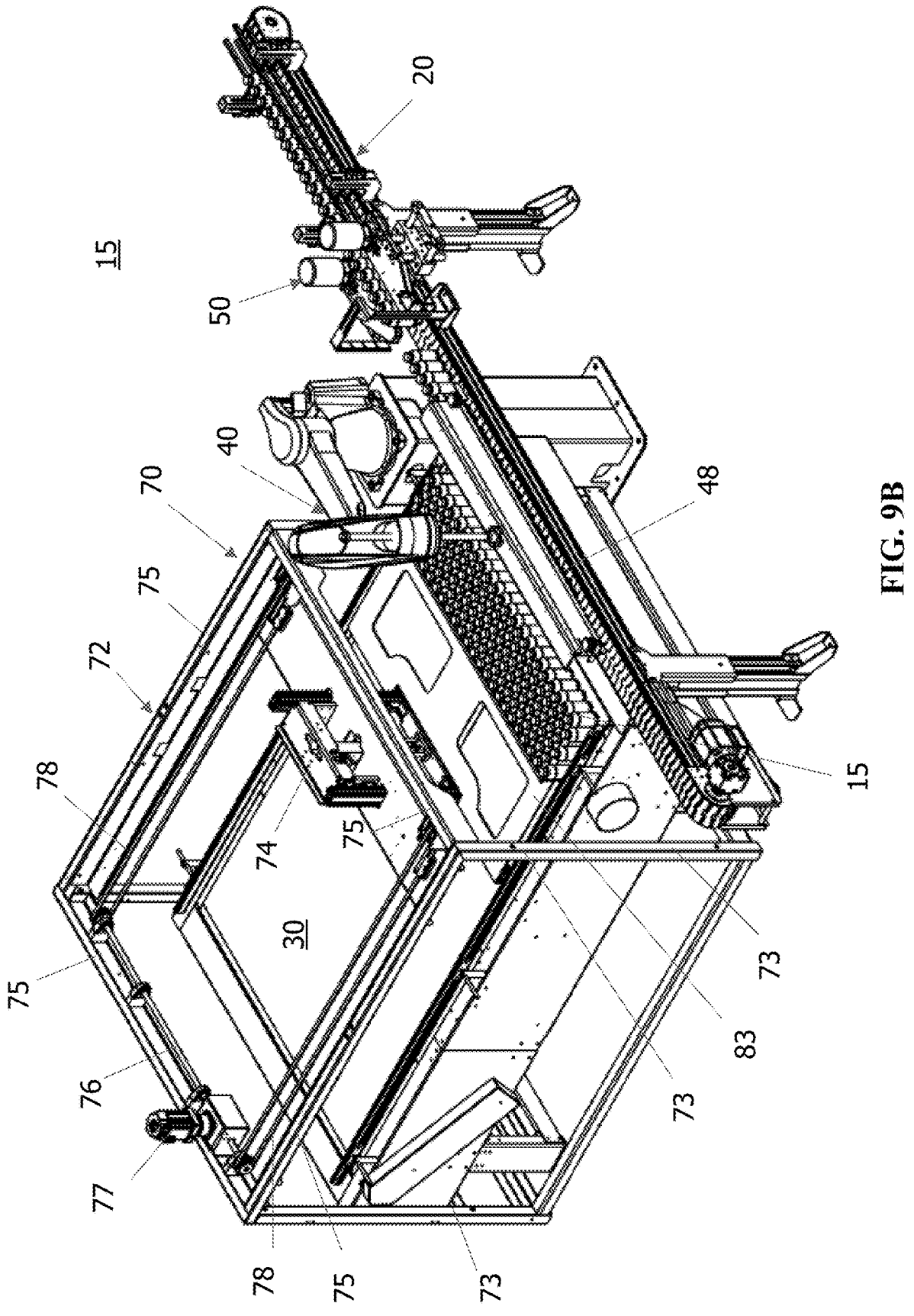

FIGS. 9A and 9B, in an alternative embodiment, illustrate system 15 which is similar to system 10 of FIGS. 1A and 1B except system 15 includes a stabilizing apparatus 70 to stabilize or hold the row of articles 15 near an upstream end portion of the array forming conveyor 30. Similar elements will be referenced using the same reference numbers and will not be further described hereinafter. The stabilizing apparatus 70 is specifically designed for articles that may not remain upright on the entire surface of the array forming conveyor 30. By way of example, articles that are thin and/or tall, which can easily be prone to tipping. Accordingly, the stabilizing apparatus 70 collects and forms the rows of articles 15 near the upstream end of the array forming conveyor 30 and later conveyed as an array to be bulk palletized, bagged or loaded into a box or pallet.

Figure 10A:
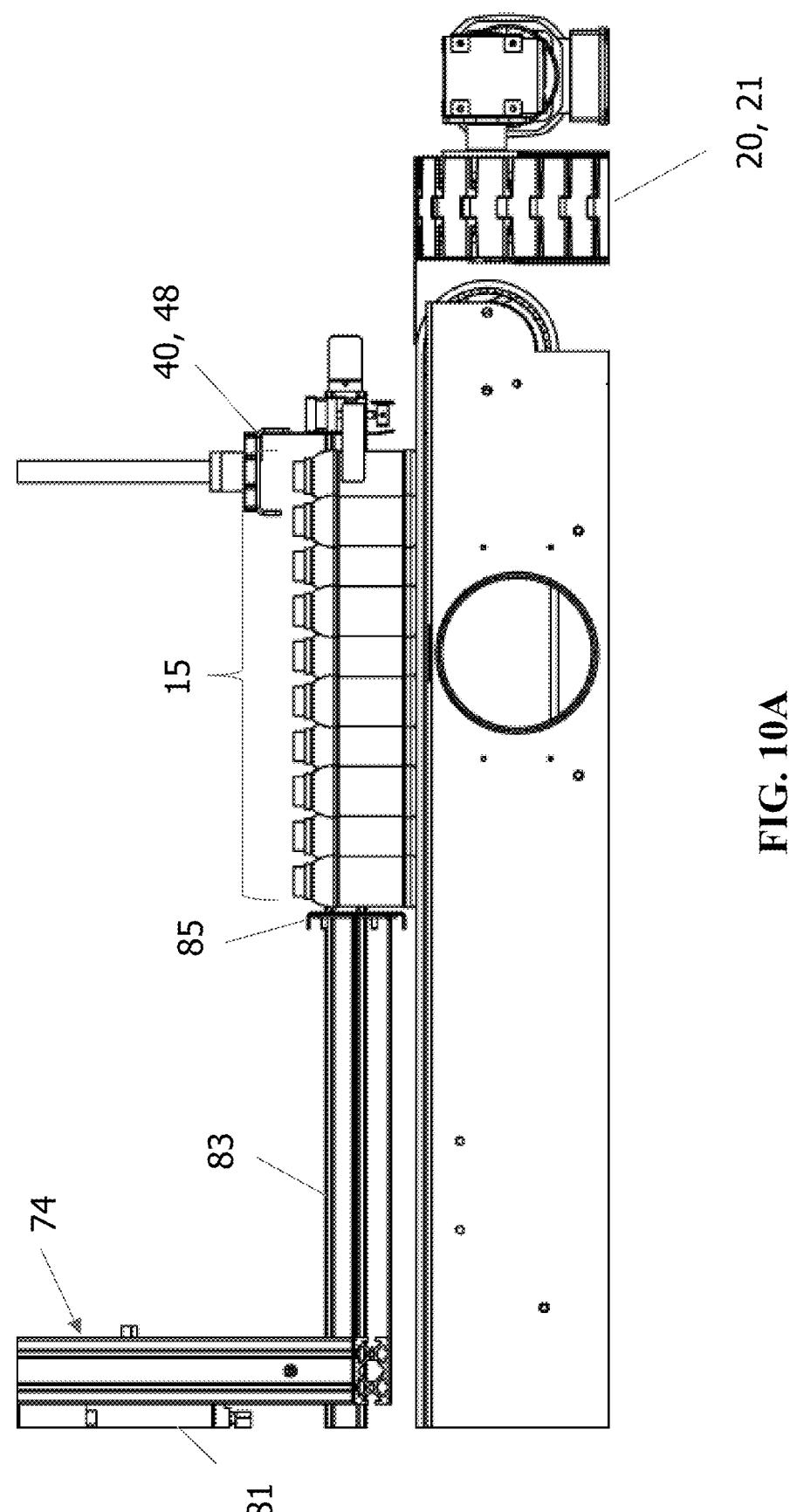
FIGS. 10A-10E are perspective side views of another exemplary robot head forming a row of articles, according to example embodiments of the present disclosure.

As shown, the stabilizing apparatus 70 includes a structure 72 disposed above the array forming conveyor 30. The structure 72 includes two pairs of vertical frame members 73 and two pairs of horizontal frame members 75 interconnected to each other forming a substantially rectangular-like shape sufficient to surround and overlay the array forming conveyor 30. The structure 72 supports and includes a stabilizer 74 that is configured to move vertically and horizontally. The vertical movement is driven by an actuator 81, such as a pneumatic cylinder connected to a pressurized air source (not shown). In response to the pneumatic cylinder 81 being urged by the pressurized air source to a first position (extended position), the stabilizer 74 moves vertically downwards toward the array forming conveyor 30 (FIG. 10A). Conversely, when the pneumatic cylinder 81 is at a second position (retracted position), the stabilizer 74 moves vertically upwards away from the array forming conveyor 30 and permits the array of articles to pass through underneath (FIG. 10D). The horizontal movement is driven by a drive apparatus 76 driven by a motor 77, e.g., AC motor, DC motor, or servo motor. In some implementations, the drive apparatus 76 includes pulleys 78 at each side portion of the structure 72 to move the stabilizer 74 towards or away from the upstream end of the array forming conveyor 30 or the sweeping area 25 of the infeed conveyor 20.

At a lower end of the stabilizer 74, a support plate 83 supporting a stabilizing bar member 85 is provided, as shown in FIGS. 10A-10E. The stabilizing bar member 85 is configured to stabilize or hold the rows of articles 15 in place near the upstream end of the array forming conveyor 30 for articles that may not able to travel the entire length of the array forming conveyor 30 without tipping or falling down. To describe differently, the stabilizing bar member 85 in its lowered position enables the rows of articles 15 to form an array prior to being transported further down the array forming conveyor 30. This ensures a stable, collective method to transport the rows of articles 15 in a secure manner.

Figure 10B:
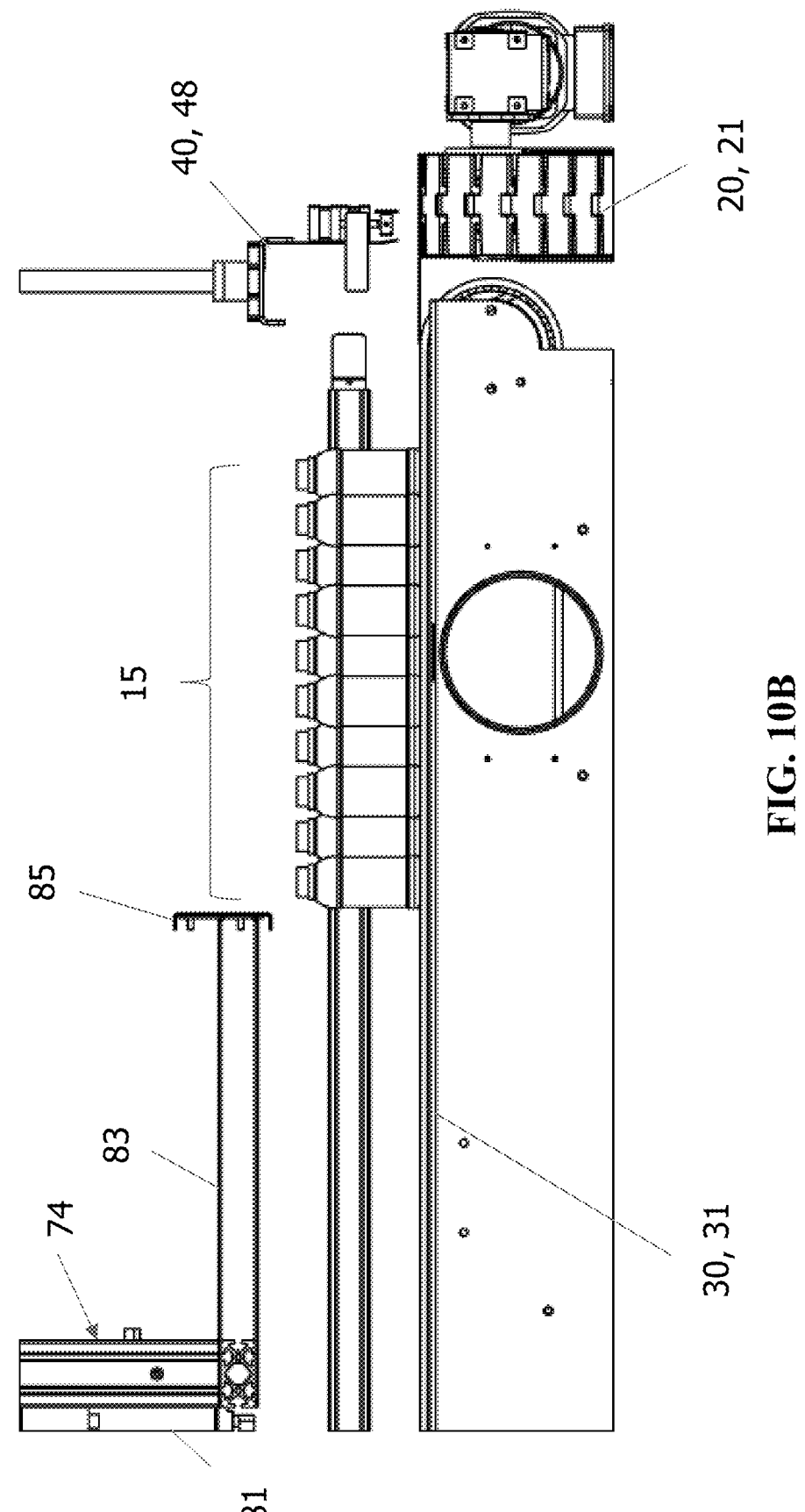
Figure 10C:
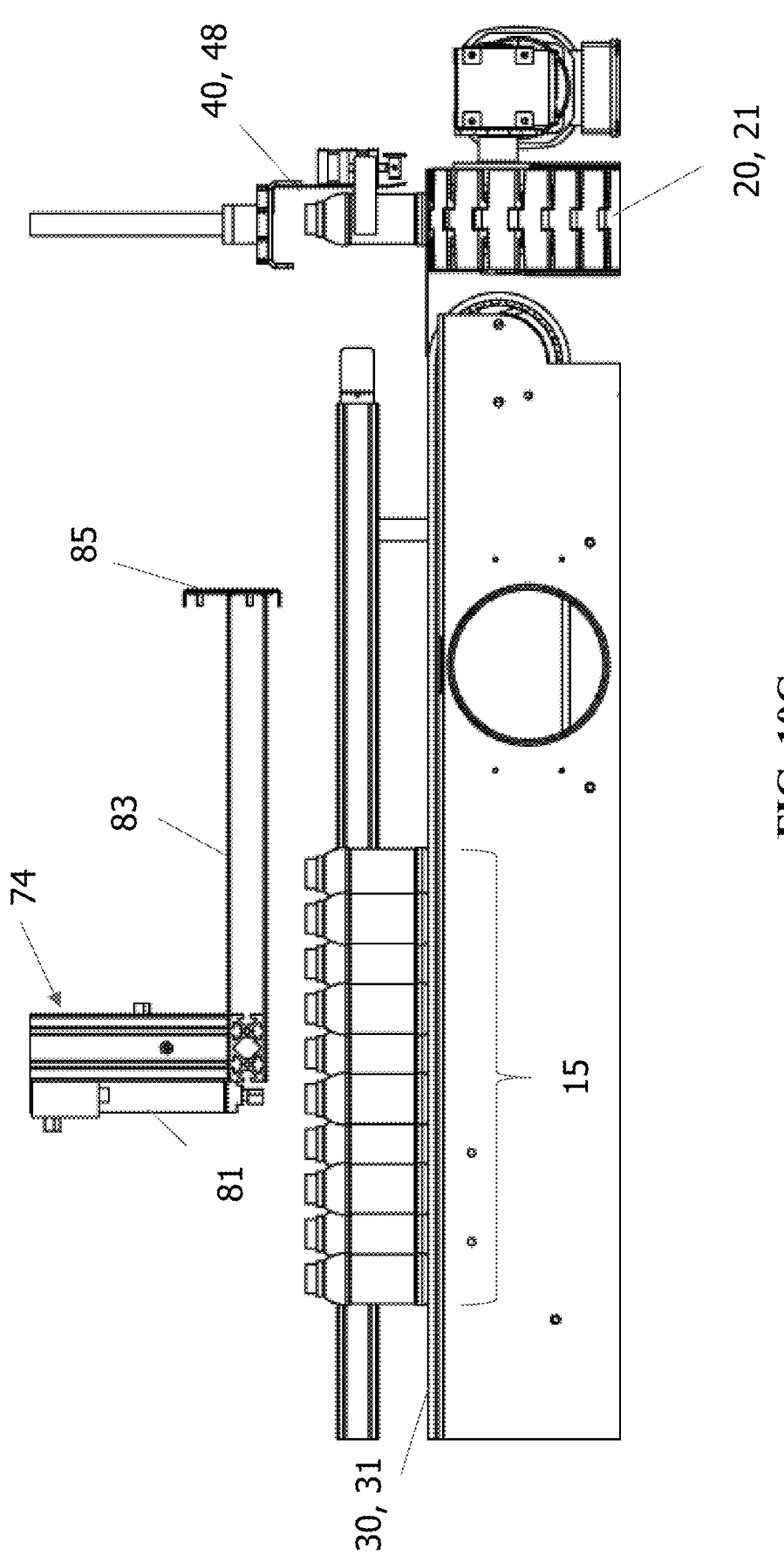
Figure 10D:
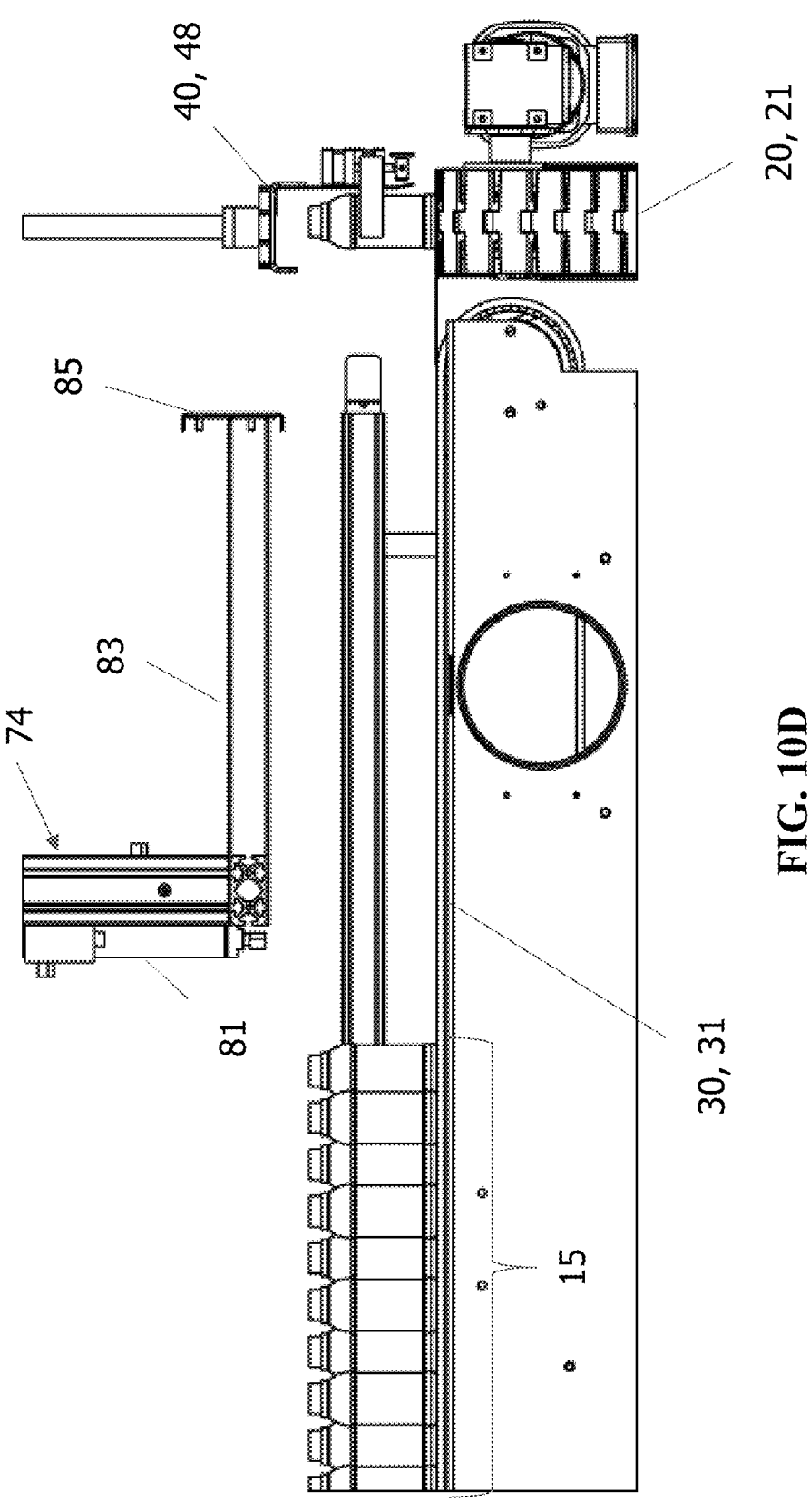
Figure 10E:
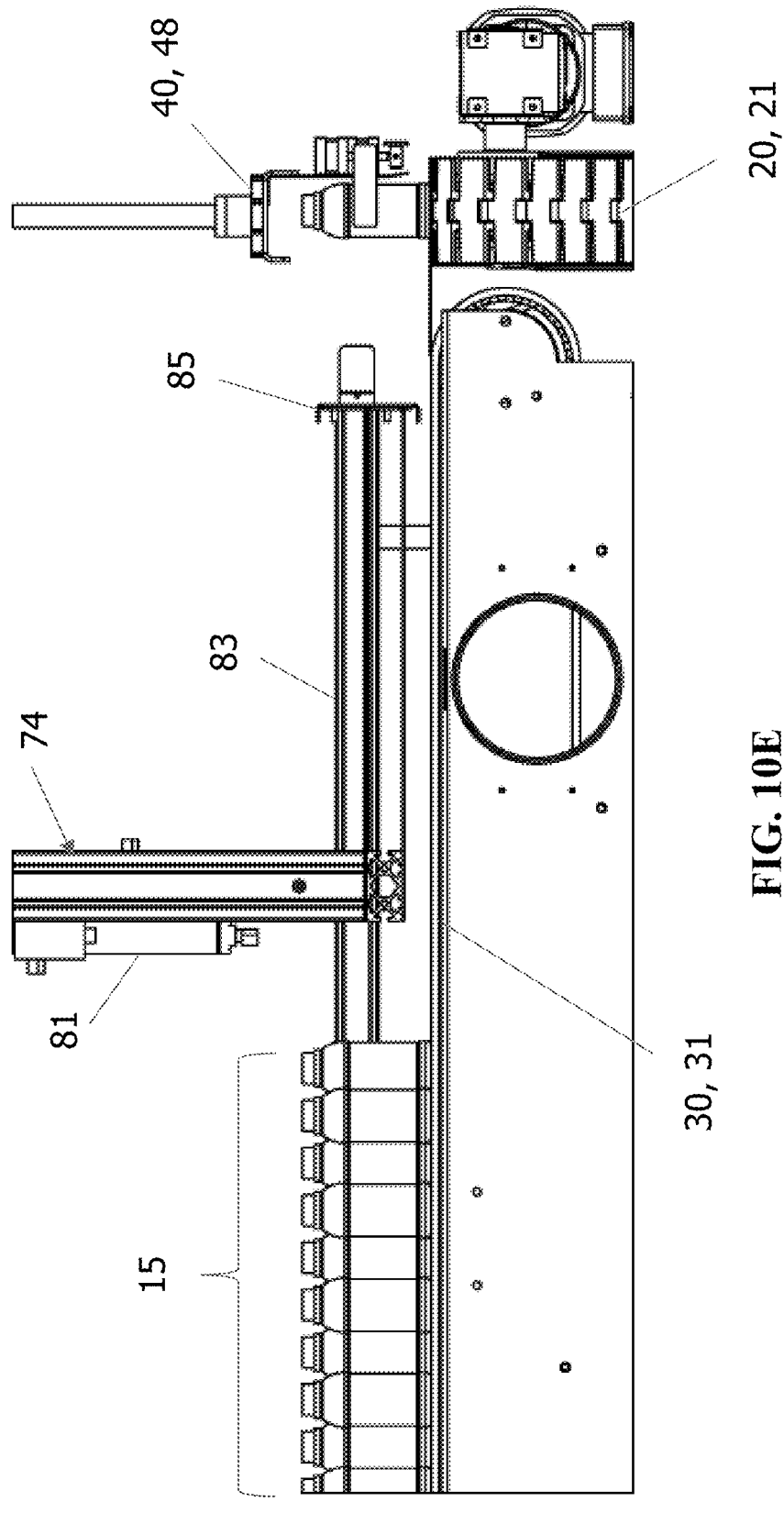

Referring to FIGS. 10A-10E, once the rows of articles 15 form an array is completed (FIG. 10A), the stabilizer 74 lifts upward (FIG. 10B) with sufficient clearance to clear the top portions of the articles and begins to move horizontally towards the upstream end of the array forming conveyor 30 or the sweeping area 25 of the infeed conveyor 20 (FIG. 10C) while the array of articles 15 moves along the array forming conveyor 30 in the opposite direction. Next, the stabilizer 74 continues to move towards the upstream end of the array forming conveyor 30 until it reaches its initial position (FIG. 10D) and is then lowered to receive the first row of articles (FIG. 10E). The stabilizer 74 will receive individual rows of articles and move away from the upstream end of the array forming conveyor 30 for each received row of articles until a complete array is formed, as shown in FIG. 10B. This is one cycle and is repeated for the formation of the array.

It is to be understood that the operation and movement of associated stabilizer 74 can be controlled by a processor or control device or controller (not shown), operating in a known manner, and is driven by any appropriate drive mechanism known in the art, and not limited to those disclosed in the exemplary embodiments described herein.

Figure 13A:
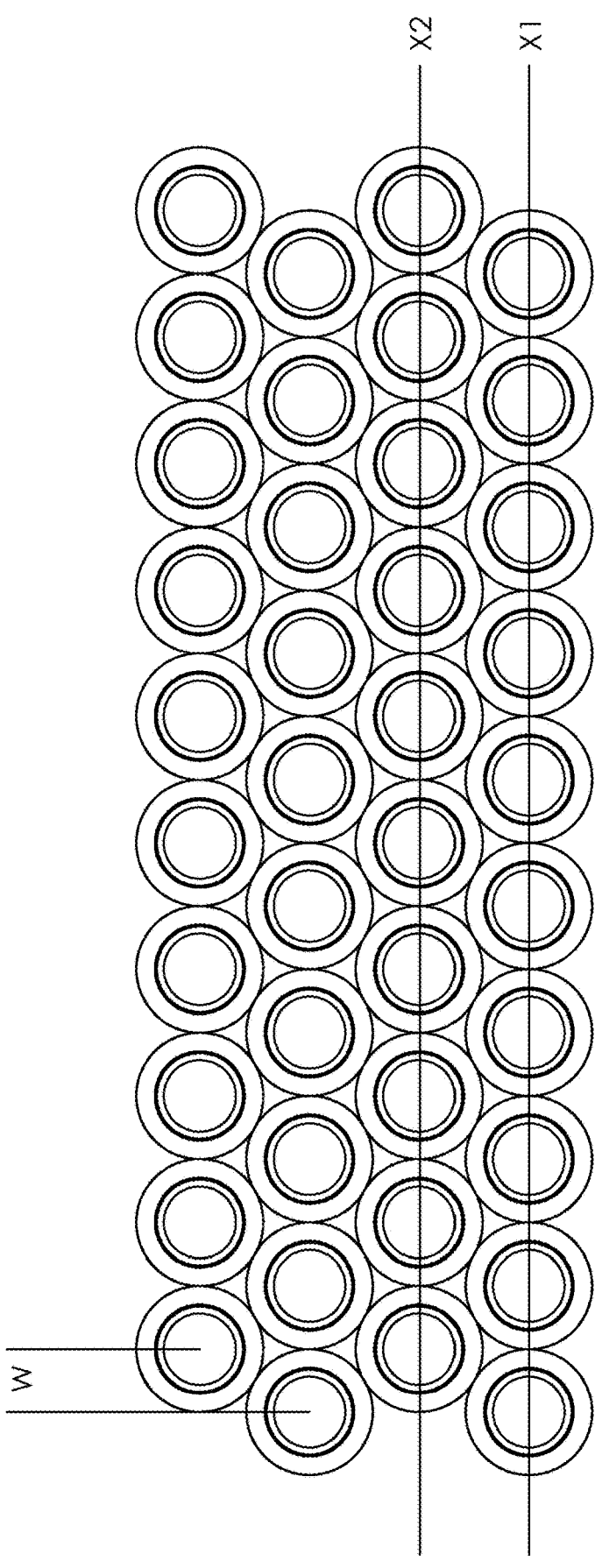
FIG. 13A is a view of an array with nested rows arrangement, according to example embodiments of the present disclosure.
Figure 13B:
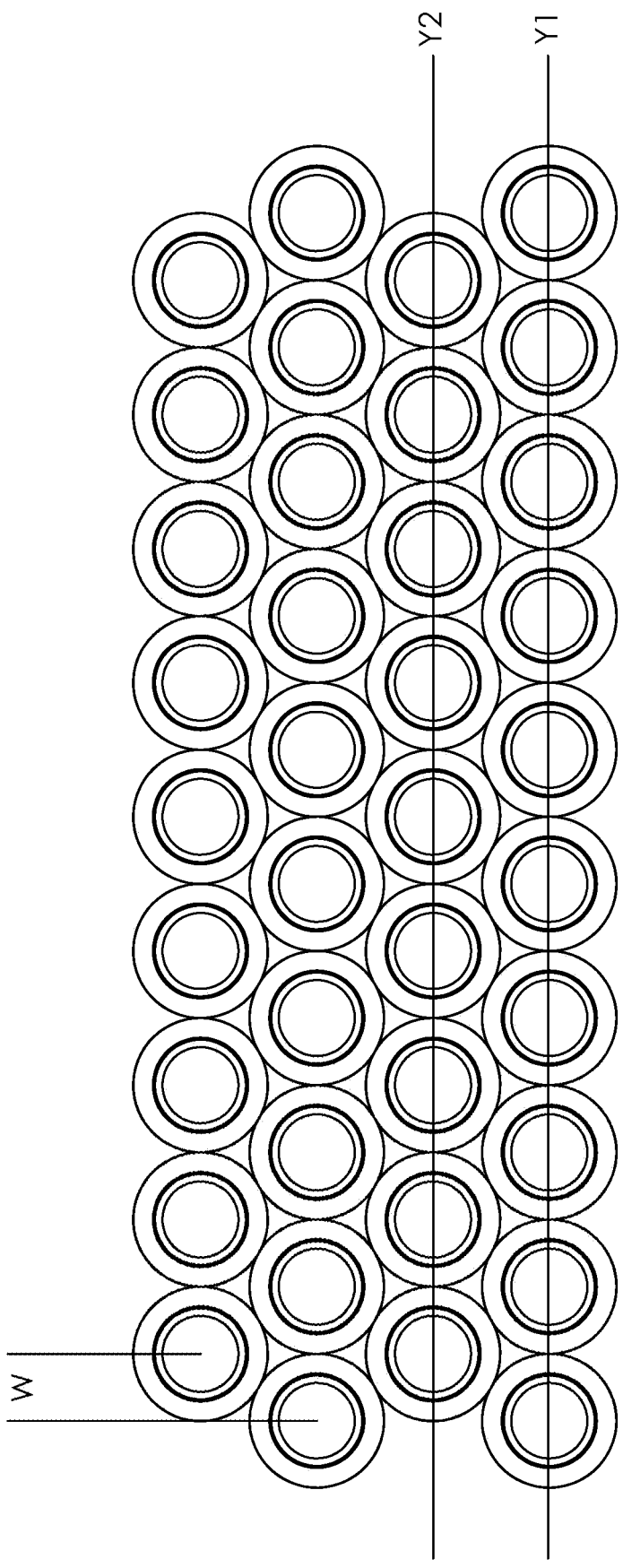
FIG. 13B is a view of an array with nested rows with alternative article counts arrangement, according to example embodiments of the present disclosure.

FIGS. 13A and 13B illustrate exemplary arrangements of the article array, formed by system 10. The present system 10 has the function to form the array with various, different arrangements. For instance, as shown in FIG. 13A, the array arrangement in this embodiment includes offset rows of articles used for nesting to maximize the array size. By way of example only, each of row $X_1$ and $X_2$ have 10 bottles aligned in an x-direction with an offset W in a y-direction for either row $X_1$ or $X_2$, forming a nested rows arrangement. Alternatively, as shown in FIG. 13B, the array arrangement in this embodiment includes alternate counts of bottles used to nest long and short rows on the array forming table to maximize the array size. By way of example only, row $Y_1$ has 10 bottles aligned in an x-direction and row $Y_2$ has 9 bottles aligned in an x-direction and offset W in a y-direction, forming a nested rows with alternate bottle counts arrangement. It should be appreciated that other arrangements can be employed besides the ones described herein.

Further, FIG. 7B illustrates how the offset is formed on the array forming conveyor 30. As shown, the offset is provided for each row of articles 15 where one row of articles 15 is closer to the right side of the array forming conveyor 30 and the next row of articles 15 is closer to the left side of the array forming conveyor 30, forming the nested row arrangement. The system is programmed such that the robot 40 can precisely and accurately sweep the rows of articles onto the array forming conveyor 30 from the infeed conveyor 20 and form the nested row arrangement as described herein.

In some implementations, a sensor (not shown) can be employed to detect a leading edge of each article as it moves along the flow path. In one example, the sensor is a photoelectric sensor (or a photoeye sensor) that can detect a change in light intensity by using laser scanners to measure a depth of various points in an image with infrared light, for example. This depth can be associated as the measured distance, which can be measured from the sensor to a surface of the article. In one implementation, the sensor can include a light emitter that produces the light to bounce off a targeted article and returned to a light receiver. Based on a time difference, via a timer, between the emission of the light and its return to the light receiver after being reflected by the targeted article, the sensor is able to measure the distance between the surface of the article and the sensor. For example, the controller, via the sensor, can determine the first article of each formed row of articles to provide the appropriate separation.

In other implementations, the sensor can use travel-time to determine distance (or depth), such as, for example, time pulses or phase shift of an amplitude modulated wave. This measured distance is then communicated to the controller to be processed.

In some implementations, a camera (not shown) can be employed to inspect the articles or the array of articles. When the camera detects any anomalies or defects, the controller will provide instructions to transport the defected articles away from the assembly area of the tabletop.

To achieve the foregoing and other objects, and in accordance with the purposes of the present invention and described herein, a system for controlling the flow of closely spaced articles along a flow path to an array forming conveyor for forming article arrays is provided. The controlling concepts can be used in a wide variety of applications, but is particularly useful in the packaging industry where bottles or containers are received from an infeed conveyor. The system of the present disclosure allows adaptation to a variety of shapes of articles and can adapt its operation to receiving the articles in surges or bunches, or otherwise in a generally irregular or random fashion.

In the description of the present application, it is to be noted that terms such as "mounted", "joined", and "connected" are to be understood in a broad sense unless otherwise expressly specified and limited. For example, the term "connected" may refer to "securely connected" or "detachably connected"; may refer to "mechanically connected" or "electrically connected"; or may refer to "connected directly", "connected indirectly through an intermediary", or "connected in two components". For those of ordinary skill in the art, the specific meanings of the preceding terms in the present application may be understood based on specific situations.

The articles "a" and "an," as used herein, mean one or more when applied to any feature in embodiments of the present disclosure described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used. The adjective "any" means one, some, or all indiscriminately of whatever quantity.

"At least one," as used herein, means one or more and thus includes individual components as well as mixtures/combinations.

The transitional terms "comprising", "consisting essentially of" and "consisting of", when used in the appended claims, in original and amended form, define the claim scope with respect to what unrecited additional claim elements or steps, if any, are excluded from the scope of the claim(s). The term "comprising" is intended to be inclusive or open-ended and does not exclude any additional, unrecited element, method, step or material. The term "consisting of" excludes any element, step or material other than those specified in the claims and, in the latter instance, impurities ordinarily associated with the specified material(s). The term "consisting essentially of" limits the scope of a claim to the specified elements, steps or material(s) and those that do not materially affect the basic and novel characteristic(s) of the claimed disclosure. All materials and methods described herein that embody the present disclosure can, in alternate embodiments, be more specifically defined by any of the transitional terms "comprising," "consisting essentially of," and "consisting of."

Although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that, if an element is referred to as being "connected" or "coupled" to another element, it can be directly connected, or coupled, to the other element or intervening elements may be present. In contrast, if an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

Spatially relative terms (e.g., "beneath," "below," "lower," "above," "upper" and the like) may be used herein for ease of description to describe one element or a relationship between a feature and another element or feature as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, for example, the term "below" can encompass both an orientation that is above, as well as, below. The device may be otherwise oriented (rotated 90 degrees or viewed or referenced at other orientations) and the spatially relative descriptors used herein should be interpreted accordingly.

Example embodiments are described herein with reference to cross-sectional illustrations that are schematic illustrations of idealized embodiments (and intermediate structures). As such, variations from the shapes of the illustrations as a result, for example, of manufacturing techniques and/or tolerances, may be expected. Thus, example embodiments should not be construed as limited to the particular shapes of regions illustrated herein but may include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While the disclosure has been described with reference to a preferred embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system for forming an array of articles, comprising:
an infeed single lane conveyor moving a plurality of articles;
an array forming conveyor;
a programmable robot for transferring the articles to the array forming conveyor, the programmable robot includes a pusher mounted at an end of the programmable robot that is configured to form and push a row of articles to the array forming conveyor, forming an array of articles arrangement, wherein the pusher includes an end stop for holding the articles until the row of articles is formed, and the end stop is configured to be actuated in a retractable position; and
an article metering device including a speed controller to control the flow of articles into a sweeping area of the infeed single lane conveyor,
wherein the programmable robot includes a conveyor tracking element to provide a continuous flow of articles between the infeed single lane conveyor and the array forming conveyor,
wherein, during one cycle time, the conveyor tracking element controls the programmable robot to match a speed of the infeed single lane conveyor before the programmable robot starts to slow down to match a speed of the array forming conveyor.

2. The system of claim 1, wherein the pusher has a first portion for engaging a body portion of the articles.

3. The system of claim 1, wherein the pusher has a first portion for engaging a neck portion of the articles and a second portion for engaging a body portion of the articles.

4. The system of claim 3, wherein the first portion is substantially U-shaped.

5. The system of claim 1, wherein the infeed single lane conveyor moves in a first direction causing the articles to move in the first direction and the array forming conveyor moves in a second direction causing the articles to move in the second direction, wherein the second direction is different than the first direction.

6. The system of claim 5, wherein the second direction is orthogonal to the first direction.

7. The system of claim 1, further comprising an encoder located on the infeed conveyor to determine the speed of the infeed single lane conveyor.

8. The system of claim 7, wherein the encoder sends a signal to the article metering device to control the flow of articles into the sweeping area.

9. The system of claim 8, wherein the encoder, in conjunction with the conveyor tracking element of the programmable robot, sends a signal to the article metering device to control the flow of articles into the sweeping area.

10. The system of claim 1, further comprising an encoder located on the array forming conveyor to determine the speed of the array forming conveyor.

11. The system of claim 10, wherein the encoder sends a signal to the article metering device to control the flow of articles onto the array forming conveyor.

12. A system for forming an array of articles, comprising:
an infeed single lane conveyor moving a plurality of articles and configured to move in a first direction;
an array forming conveyor configured to move in a second direction orthogonal to the first direction;
a programmable robot for transferring the articles to the array forming conveyor, the programmable robot includes a pusher mounted at an end of the programmable robot that is configured to engage and form a row of articles in a sweeping area and releases the formed row of articles by pushing the formed row of articles onto the array forming conveyor, forming an array of articles arrangement, wherein the pusher includes an end stop for holding the articles until the row of articles is formed, and the end stop is configured to be actuated in a retractable position; and
an article metering device including a speed controller to control the flow of articles from the infeed single lane conveyor to the array forming conveyor,
wherein at time of engagement of the row of articles in the sweeping area, the article metering device matches a speed of the infeed single lane conveyor in the first direction,
wherein at time of release of the formed row of articles from the sweeping area, the article metering device matches a speed of the array forming conveyor in the second direction, and
wherein, during one cycle time, the conveyor tracking element controls the programmable robot to match the speed of the infeed single lane conveyor before the programmable robot starts to slow down to match the speed of the array forming conveyor.

13. A method of forming an array of articles, the method comprising:
transporting, on an infeed single lane conveyor, a plurality of articles;
receiving and forming a row of articles by a programmable robot including a pusher;
holding the row of articles, via an end stop at one end of the pusher, until the row of articles is formed;
actuating the end stop to retract the end stop and release the row of articles;

pushing, via the pusher of the programmable robot, the formed row of articles to an array forming conveyor to form an array of articles arrangement;
controlling, via an article metering device including a speed controller, a flow of articles arriving from the infeed single lane conveyor; and
based on the speed of the infeed conveyor, matching a motion of the programmable robot to provide a continuous flow of articles.

14. The method of claim 13, further comprising, upon formation of the row of articles, reducing the speed of the article metering device to create spacing between each row of articles.

15. The method of claim 13, further comprising:
transporting the articles on the infeed conveyor moving in a first direction; and
transporting the articles on the array forming conveyor moving in a second direction different than the first direction.

16. The method of claim 15, wherein the second direction is orthogonal to the first direction.

17. The method of claim 13, further comprising sending, via an encoder, a signal to the article metering device to match the speed of the infeed conveyor.

18. The method of claim 17, wherein the programmable robot includes a conveyor tracking element, wherein the encoder, in conjunction with the conveyor tracking element, sends a signal to the article metering device to match the speed of the infeed conveyor.

19. The method of claim 13, wherein, while the programmable robot is pushing the row of articles to the array forming conveyor, a next row of articles is fed to a pushing area of the array forming conveyor simultaneously.

20. A system for forming an array of articles, comprising:
an infeed single lane conveyor moving a plurality of articles;
an array forming conveyor;
a programmable robot for transferring the articles to the array forming conveyor, the programmable robot includes a pusher mounted at an end of the programmable robot that is configured to form and push a row of articles to the array forming conveyor, forming an array of articles arrangement, wherein the pusher includes an end stop for holding the articles until the row of articles is formed, and the end stop is configured to be actuated in a retractable position; and
an article metering device including a speed controller to control the flow of articles into a sweeping area of the infeed single lane conveyor,
wherein the programmable robot includes a conveyor tracking element to match a speed of the infeed single lane conveyor to provide a continuous flow of articles.

* * * * *